United States Patent [19]
Horiuchi et al.

[11] Patent Number: 5,898,502
[45] Date of Patent: Apr. 27, 1999

[54] OPTICAL WAVELENGTH MONITORING APPARATUS

[75] Inventors: Yukio Horiuchi; Shu Yamamoto, both of Tokyo, Japan

[73] Assignees: Kokusai Denshin Denwa Kabushiki Kaisha; KDD Submarine Cable Systems Inc., both of Tokyo, Japan

[21] Appl. No.: 08/878,543

[22] Filed: Jun. 19, 1997

[30] Foreign Application Priority Data

Jun. 21, 1996 [JP] Japan ................................ 8-161996

[51] Int. Cl.⁶ ........................ H04B 110/08; G01J 3/51
[52] U.S. Cl. ...................... 356/416; 356/419; 250/226; 372/32
[58] Field of Search ..................... 356/416, 419; 250/226, 205; 372/32

[56] References Cited

U.S. PATENT DOCUMENTS 4,821,273  4/1989  Hori .......................................... 372/32
4,998,043  3/1991  Unami et al. ............................ 250/205

Primary Examiner—F. L. Evans
Attorney, Agent, or Firm—Christie, Parker & Hale, LLP

[57] ABSTRACT

In an optical wavelength monitoring apparatus for easily monitoring wavelength deviation, light introduced from a laser source 10 to an optical transmission line 12 is divided by directional couplers 14, 20. Optical output of the directional coupler 14 is converted into an electrical signal by a photodiode 16, and logarithmic-amplified by a logarithmic amplifier 18. Optical output of the directional coupler 20 is introduced to a photodiode 26 via an optical filter 24. The optical filter 24 is an optical element whose transmittance decreases as the incident light deviates from a specific wavelength $\lambda a$. Optical output from the optical filter 24 is converted into an electrical signal by a photodiode 26, and logarithmic-amplified by a logarithmic amplifier 28. A differential amplifier 30 outputs a difference between outputs of the amplifiers 18, 28. A comparator 32 compares the output of the differential amplifier 30 with an alarm threshold Vref, and outputs an alarm-on signal when the difference is Vref or higher.

20 Claims, 17 Drawing Sheets

OPTICAL WAVELENGTH MONITORING APPARATUS

FIELD OF THE INVENTION

This invention relates to an optical wavelength monitoring apparatus, and more particularly to an apparatus capable of easily monitoring an optical wavelength whether an optical wavelength is within a predetermined range or not.

BACKGROUND OF THE INVENTION

Generally used as an optical source of a transmitter apparatus of an optical transmission system is a laser diode (hereinafter called laser device). Although the oscillation wavelength of a laser device is determined by the cavity length, since the refractive index of the cavity varies with temperature of the laser device, the cavity length also varies equivalently. To prevent this, an electronic cooling element such as Peltier element has been used conventionally to stabilize the temperature of the laser element.

However, even if the temperature is held constant, since the laser bias current increases with aged deterioration, the oscillation wavelength also varies. Moreover, aged changes, deterioration and troubles of a temperature detector element such as thermistor, temperature control element such as Peltier element and temperature control circuit for driving the temperature control element in response to output of the temperature detector element may disable the control for stabilizing the temperature at a desired value. Due to these facts, the optical output wavelength of the laser element may deviate from the desired value.

Especially, in wavelength-division-multiplex optical transmission, control must be made to stabilize each optical wavelength, and particular consideration is required to prevent any affection to optical signals with other optical wavelengths. Shown below are some conventional apparatuses for monitoring individual optical wavelengths in wavelength-division-multiplex optical transmission systems. FIGS. 16 and 17 are block diagrams of general constructions of conventional apparatuses used to multiplex eight optical wavelengths.

Explanation is made on FIG. 16. Optical transmitters 310-1, 310-2, . . . 310-8 respectively include laser elements for oscillation in different optical wavelengths and modulator elements for modulating the laser optical outputs by input data. Respective optical outputs from the optical transmitters 310-1, 310-2, . . . 310-8 are each divided into two parts by optical dividers 312-1, 312-2, . . . 312-8. One of the two parts is applied to the optical composer 314, and the other is applied to a channel selector 316. The optical composer 314 composes optical signals from the optical dividers 312-1, 312-2, . . . 312-8, namely, wavelength-division-multiplexes these signals, and supplies its output to an optical transmission line (optical fiber). The channel selector 316 selects one of optical signals from the optical dividers 312-1, 312-2, . . . , 312-8, and applies it to a wavemeter 318.

The wavemeter 318 has built-in wavelength reference light, and can measure optical wavelengths with quite a high accuracy by using a Michelson interferometer. However, the Michelson interferometer basically has to continuously move a reflector, such as corner-cube. That is, it includes a movable portion. Apparatuses of this type are acceptable for use in laboratories, but not suitable for use in transmission facilities that must maintain a reliability for a continuous, long period of time.

Another conventional apparatus shown in FIG. 17 is explained. This apparatus measures respective wavelengths from a wavelength-multiplexed optical signal. Optical transmitters 320-1, 320-2, . . . , 320-8 respectively include laser elements for oscillation in different optical wavelengths and modulator elements for modulating the laser optical outputs by input data. Respective optical outputs from the optical transmitters 320-1, 320-2, . . . 320-8 are composed, namely, wavelength-division-multiplexed, by an optical composer 322. An optical divider 324 divides the optical signal output from the optical composer 322 into two parts, and applies one of the parts to a transmission line (optical fiber) and the other to a monitoring apparatus 326 that can collectively measure individual optical wavelengths of multiple channels.

The monitoring apparatus 326 practically includes a wavemeter capable of measuring a plurality of wavelengths collectively based on the same theory as the wavemeter 318 or an optical spectrum analyzer for measuring the wavelength of a signal from a peak value obtained by sweeping a spectroscope, and displays and/or prints out the result of the measurement.

Whichever one of a wavemeter or an optical spectrum analyzer is used as means for confirming whether an optical wavelength is held at a predetermined value or within a predetermined range, it is necessary to mechanically sweep some movable element. Since this method uses a movable element, it is not suitable for use in transmission facilities that are required to be reliable for a continuous, long period of time.

It is therefore an object of the invention to provide an optical wavelength monitoring apparatus solving the above-mentioned problem and capable of easily confirming whether an optical wavelength is held within a predetermined range.

Another object of the invention is to provide an optical wavelength monitoring apparatus less affected by environments.

Another object of the invention is to provide an optical wavelength monitoring apparatus capable of maintaining a high reliability over a long span of time.

SUMMARY OF THE INVENTION

In an apparatus according to the invention, an optical signal to be monitored is passed through an optical filter having transmission characteristics of exhibiting an extreme value of transmittance at a predetermined wavelength (for example, transmission characteristics in which transmittance is maximized at a predetermined wavelength or minimized at a predetermined wavelength), and compares the intensity of the optical output with a constant value or, preferably, the intensity of light not through the optical filter. Since the intensity of the optical output of the optical filter decreases (or increases) as the wavelength deviates from the predetermined wavelength, the apparatus can judge whether any shift in wavelength caused by changes in intensity of the optical output of the optical filter remains within an acceptable range or not. If the difference in optical intensity exceeds a predetermined value, the apparatus alarms or warns the wavelength shift.

By using wavelength divider means or wavelength composing/dividing means capable of dividing multiple wavelengths, wavelength-division-multiplexed signals can be wavelength-divided collectively, and wavelengths of individual channels can be monitored simultaneously.

Since the apparatus uses a passive element as the optical element, wavelength characteristics stable over a long time can be expected, and a high reliability can be ensured.

Additionally, a low speed element can be used as the electric element, which is an additional factor ensuring a high reliability.

By comparing the intensity of light passing through the optical filter with the intensity of light not through the optical filter, any wavelength shift can be detected without any difficulty even under changes in optical intensity, if any.

By logarithmic-amplifying the intensity of detected light, the measurement dynamic range can be extended.

By utilizing light other than that for use in information transmission, it is prevented to decrease the intensity of light for information transmission.

DESCRIPTION OF THE PREFERRED EMBODIMENTS

Explained below are some embodiments of the invention in detail with reference to the drawings.

Figure 1:
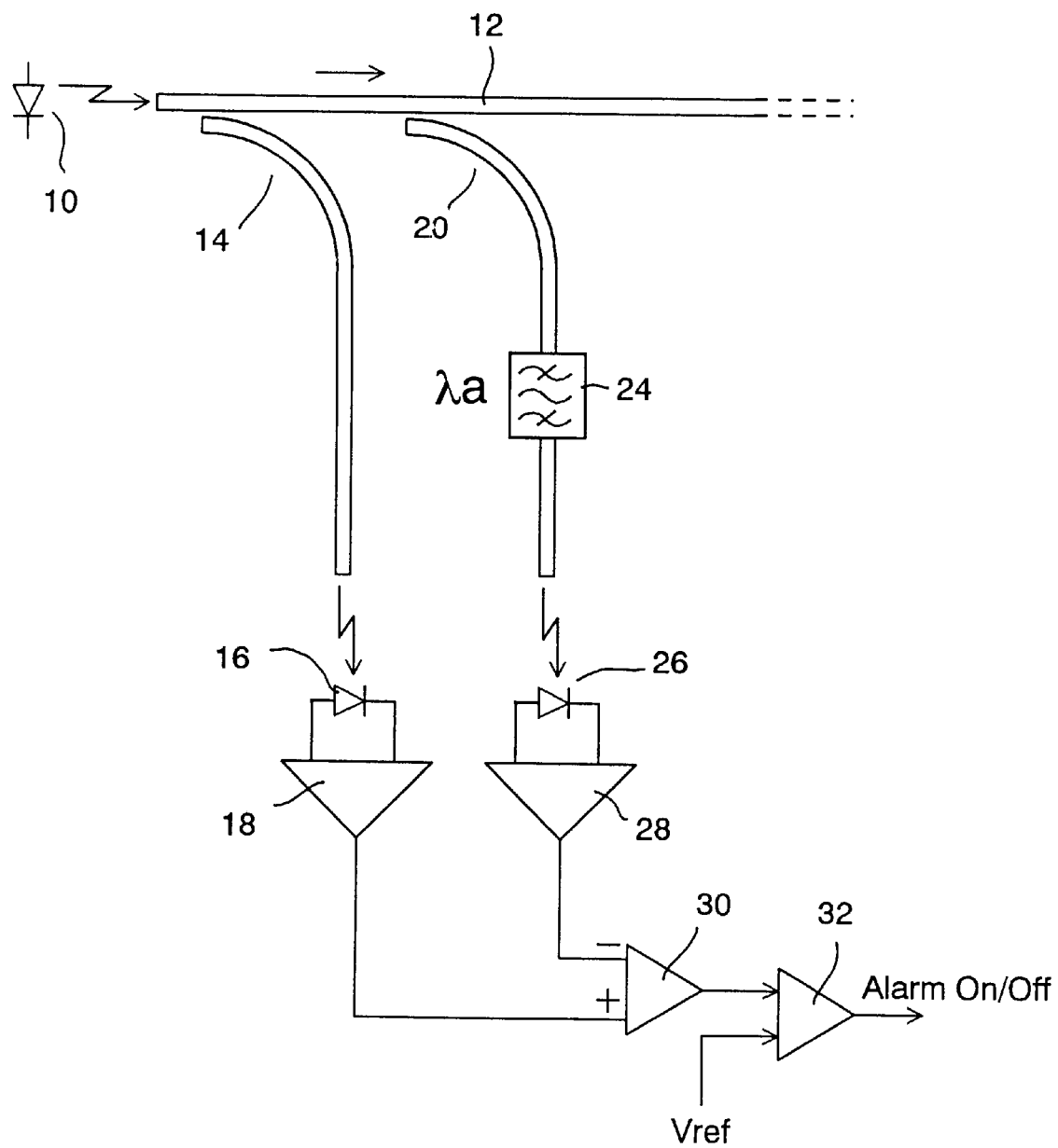
FIG. 1 is a schematic diagram of a first embodiment of the invention.

FIG. 1 shows a general construction of a first embodiment of the invention. Numeral 10 denotes a laser source which may be a laser element alone, or may include an optical modulator element for modulating optical output of the laser element and/or another optical device. In this embodiment, whichever one is acceptable. Optical output from the laser source 10 is introduced to a long-distance optical transmission medium such as optical fiber, not shown, via an optical transmission line 12. The optical signal travelling through the optical transmission line 12 is branched by a first directional coupler 14, and converted into an electrical signal in a pin photo diode 16.

Output of the pin photo diode 16 is logarithmic-amplified by a logarithmic amplifier 18 to expand the measurement dynamic range. Typical linear amplification is also acceptable. An output level of the pin photodiode 16 or its average level represents the intensity of the optical output from the laser source 10.

Figure 2:
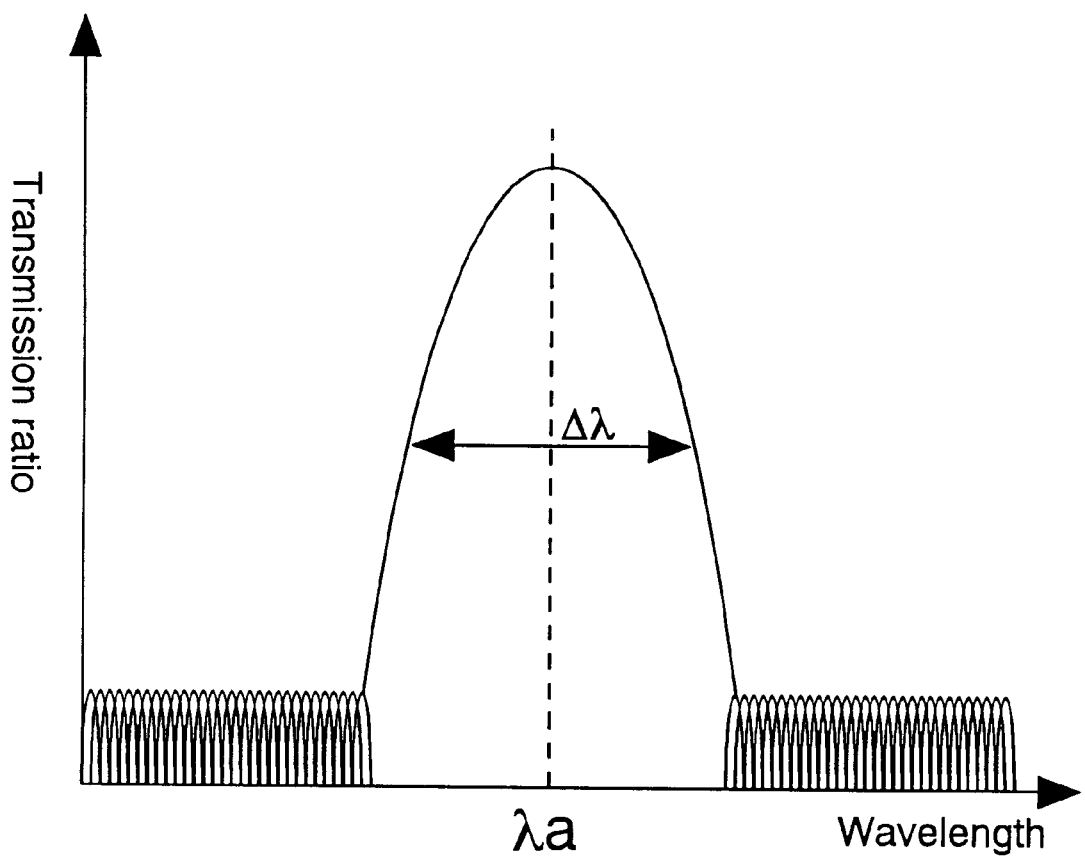
FIG. 2 is a schematic diagram of transmission characteristics of an optical filter 24.

The optical signal traveling through the optical transmission line 12 is again branched by a second directional coupler 20, and applied to a pin photodiode 26 via an optical filter 24. The optical filter 24 is an optical element having the transmission characteristics that the transmittance maximizes at a specific wavelength $\lambda a$ and decreases as the wavelength deviates from $\lambda a$, which may be a known interference optical filter. If it is undesirable that reflective light returns to the directional coupler 20, an optical isolator absorbing reflective light is interposed between the optical filter 24 and the directional coupler 20. FIG. 2 schematically shows transmission characteristics of the optical filter 24. Its transmittance is maximum at the center wavelength $\lambda a$ and decreases as the deviation from $\lambda a$ increases. When the deviation exceeds a certain value, the optical filter 24 transmits substantially no light. The center wavelength $\lambda a$ and the width $\Delta \lambda$ of the transmission characteristics are chosen in accordance with the critical value of wavelength deviation to be monitored.

For example, when 1,557 nm, 1,558 nm and 1,559 nm are wavelength-division-multiplexed by a wavelength-division-multiplex system in the band of 1.5 $\mu$m, the optical filter 24 is designed to have the transmission characteristics in which the center frequency $\lambda a$ is set at 1,558 nm, and its optical output intensity attenuates by, for example, 3 dB per 0.1 nm of wavelength deviation (that is, 1,558±0.1 nm).

The pin photodiode 26 converts the optical output of the optical filter 24 into an electric signal, and the logarithmic amplifier 28 logarithmic-amplifies the output of the pin photodiode 26. Since the transmittance of the optical filter 24 decreases as the wavelength deviates from the center wavelength $\lambda a$, the output level of the pin photodiode 26 or its average level represents the deviation amount of the optical output wavelength of the laser source 10 from the center frequency $\lambda a$.

Gains of the logarithmic amplifiers 18, 28 are adjusted such that their output levels coincide when the optical output wavelength of the laser source 10 is $\lambda a$. Output of the logarithmic amplifier 18 is connected to a noninverted input of a differential amplifier 30, and output of the logarithmic amplifier 28 is connected to an inverted input of the differential amplifier 30. Therefore, the differential amplifier 30 outputs a level value resulting from subtracting the output level of the logarithmic amplifier 28 from the output level of the logarithmic amplifier 18.

In this embodiment, since optical inputs of the photodiodes 16 and 26 are branched portions of the same optical signal, their intensity variations are absolutely equal. Therefore, intensity variations of optical outputs from the laser source 10 (typically, intensity variations by modulation) are identical when introduced to the differential amplifier 30, and affection of changes in optical intensity is canceled.

Output of the differential amplifier 30 is applied to one input of the comparator 32 which is also supplied at the other input with a threshold Vref for determination whether an alarm or warning is to be issued or not. Output of the comparator 32 exhibits a low level (alarm-off) when the output level of the differential amplifier 30 is lower than Vref, but becomes a high level (alarm-on) when the output level of the differential amplifier 30 is Vref or higher.

Since (the laser element of) the laser source 10 initially oscillates in λa approximately, the output level of the photodiode 16 and the output level of the photodiode 26 coincide approximately. In this status, output of the differential amplifier 30 becomes zero, or very low, and the output level of the comparator 32 is low.

However, when the oscillation wavelength of (the laser element of) the laser source 10 gradually deviates from λa due to aged changes or deterioration, for example, the output level of the photodiode 26 decreases in accordance with the amount of wavelength deviation. For easier understanding, let the optical output intensity be constant regardless of any shift in oscillation wavelength of the laser source 10. Since the quantity of light introduced into the photodiode 16 does not vary even when the oscillation wavelength of the laser source 10 deviates from λa, the output level of the photodiode 16 doe not change either. Therefore, as the oscillation wavelength of the laser source 10 deviates from the center frequency λa of the optical filter 24, the output voltage level of the differential amplifier 30 increases, and soon becomes Vref or higher. When the output voltage of the differential amplifier 30 increases to Vref or higher, output of the comparator 32 exhibits a high level, and an alarm or warning about the shift of the oscillation wavelength is given to a user. Practically, a light emitting diode is lit, or a buzzer sound is generated.

Figure 3:
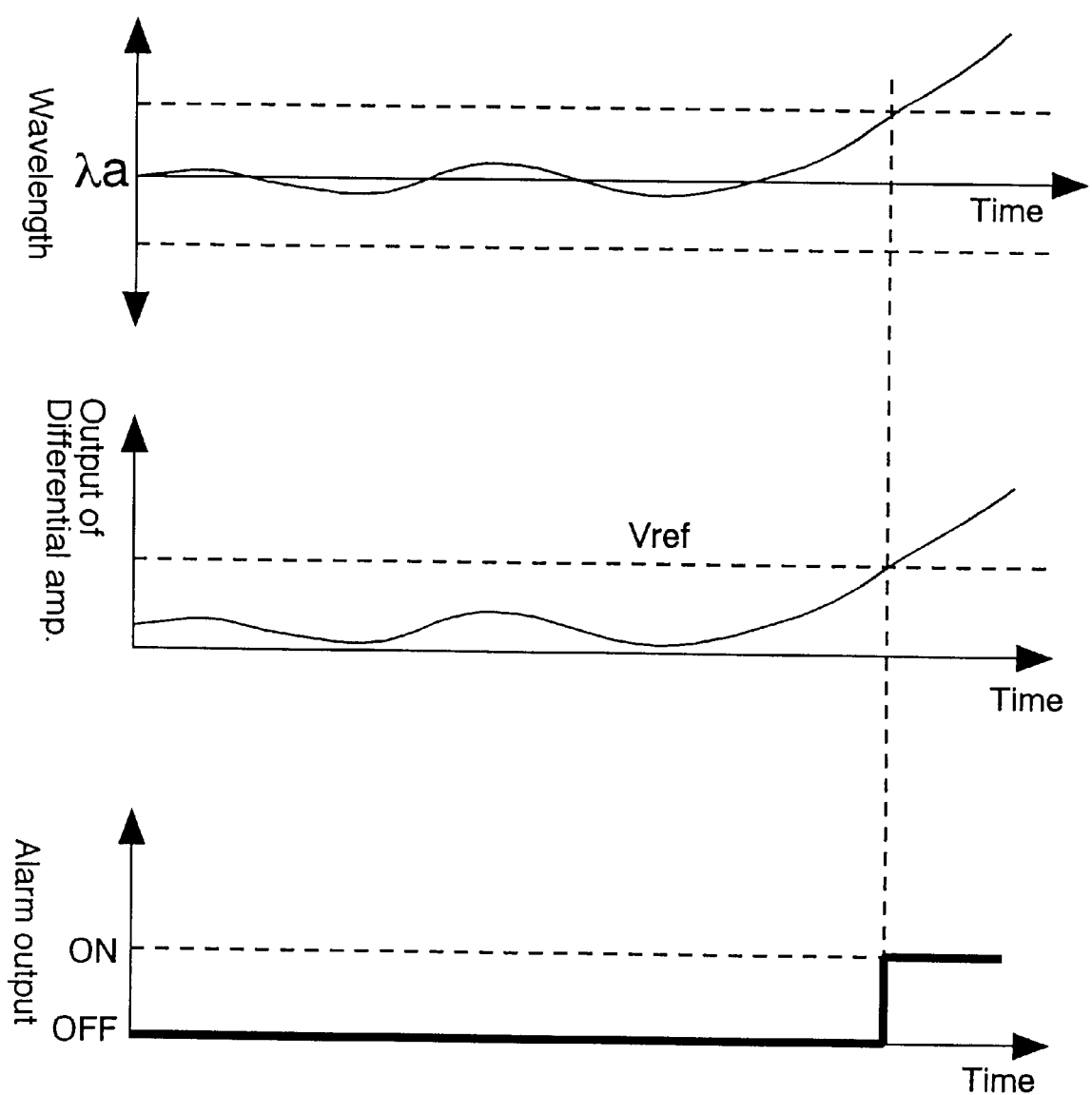
FIG. 3 is an example of changes in optical wavelength of optical output from a laser source 10 and corresponding changes in outputs of differential amplifier 30 and comparator 32.

FIG. 3 shows an example of changes in optical wavelength of optical output of the laser source 10 and corresponding changes in outputs of the differential amplifier 30 and the comparator 32. As shown in FIG. 3, when the wavelength of optical output of the laser source 10 is just or very near to λa, the output level of the comparator 32 is low. However, as the wavelength of optical output of the laser source 10 deviates from λa, the output level of the comparator 32 becomes high. That is, it can be known from the output of the comparator 32 how much the wavelength of optical output of the laser source 10 is offset from λa.

By connecting the output of the comparator 32 to a light emitting diode and/or buzzer, not shown, when the wavelength of optical output of the laser source 10 deviates a certain amount from λa, light and/or buzzer sound can be generated to call observer's attention to the wavelength deviation and the need for maintenance or examination.

This construction is useful not only for monitoring wavelength deviation of the laser source 10 but also for monitoring any malfunction, such as interruption of laser oscillation, of the laser source 10.

Although the optical filter 24 has been explained as maximizing the transmittance at the center frequency λa and decreasing the transmittance as the wavelength deviates from λa, its characteristics may be opposite such that the transmittance is minimum at the center frequency λa and increases as the wavelength deviates from λa. Such an optical filter may be made of a grating element, for example. If it is undesirable that reflective light returns to the directional coupler 20, an optical isolator absorbing reflective light is interposed between the optical filter 24 and the directional coupler 20. In this case, since the optical output intensity of the optical filter increases as the oscillation wavelength of the laser source 10 deviates from λa, it will be judged from an increase of the optical output intensity of the optical filter whether the wavelength shift is a level to be warned or not.

Figure 4:
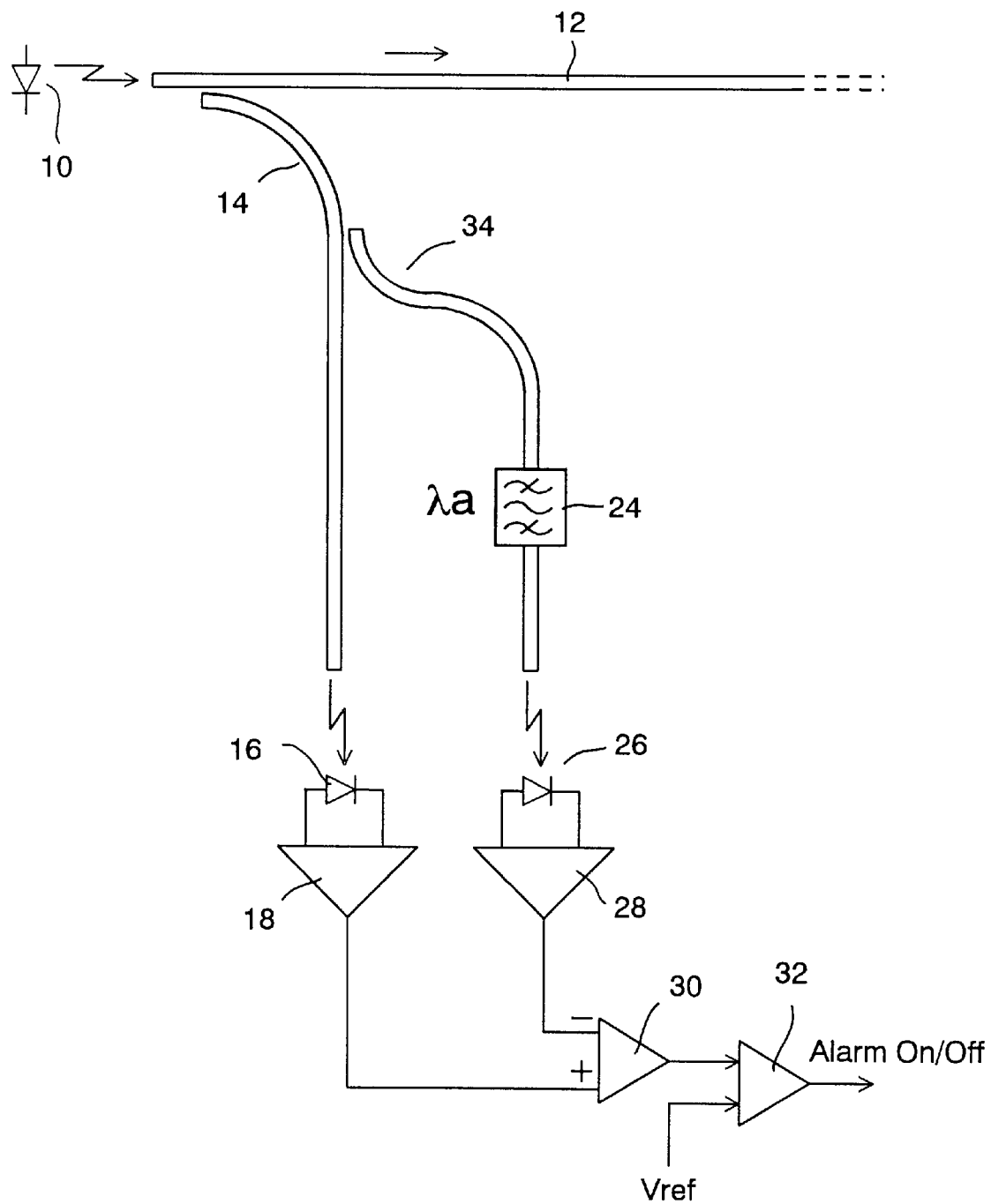
FIG. 4 is a schematic diagram of a modification of the embodiment shown in FIG. 1.

In the embodiment shown in FIG. 1, the optical signal applied to the optical filter 24 is branched out directly from the optical transmission line 12. However, as shown in FIG. 4, the optical signal branched by the directional coupler 14 may be again branched by a directional coupler 34 to apply it to the optical filter 24. Elements in FIG. 4 common to elements of FIG. 1 are labelled with the same reference numerals. With this construction, it is easier to bind or incorporate various elements for monitoring wavelengths into a unit.

Figure 5:
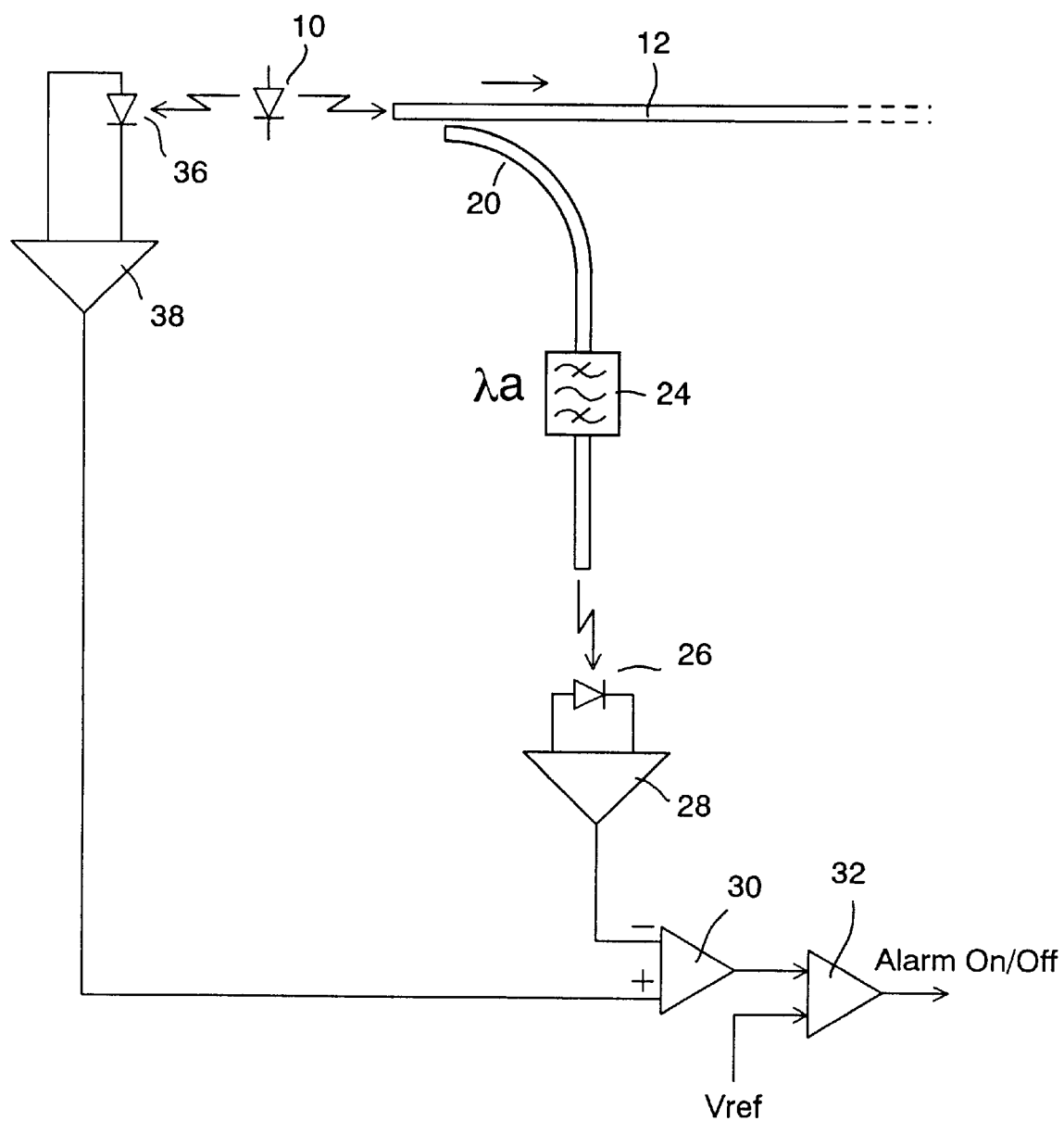
FIG. 5 is a schematic diagram of a second modification of the embodiment of FIG. 1.

In semiconductor laser elements, in general, optical outputs can be obtained from two cavity end surfaces. Normally, however, an optical signal taken from one end surface is used for signal transmission. By using optical output from the other end surface for detection of the reference of the optical output level, the directional coupler 14 can be omitted. FIG. 5 shows a general construction of an embodiment modified in this respect. Elements common to FIG. 1 are labelled with the same reference numerals. Numeral 36 denotes a pin photodiode that receives a laser beam exiting from the laser source 10 in the opposite direction from the optical transmission line 12. An output signal from the pin photodiode 36 is logarithmic-amplified by a logarithmic amplifier 38 similar to the logarithmic amplifier 18, and applied to a noninverted input of the differential amplifier 30. The gain of the logarithmic amplifier 38 (and the gain of the logarithmic amplifier 28) is adjusted so that output levels of the logarithmic amplifiers 38 and 28 coincide when the optical output wavelength of the laser source 10 is λa.

In the construction of FIG. 5, if the laser source 10 includes a modulator element, non-modulated continuous light enters in the pin photo diode 36. In this case, by sample-holding the output signal of the photodiode 26 in synchronism with the modulation signal of the laser source 10 before applying it to the logarithmic amplifier 28, affection of any intensity variation due to modulation can be removed.

Also the construction of FIG. 5, like the construction of FIG. 1, can monitor any wavelength shift of the laser source 10, and can give an observer or watchman an alarm or warning when the center wavelength is shift from λa beyond an acceptable level. Since the directional coupler 14 can be omitted, this construction can reduce the cost and can minimize the decrease in optical intensity used for signal transmission.

Needless to say, instead of branching the optical signal for detection of the optical intensity reference and the optical signal for detection of wavelength deviation from the optical signal travelling through the optical transmission line 12 as shown in FIGS. 1 and 4, the optical output from the other surface of the laser element may be divided into two parts to use one for detection of optical intensity reference and the other for detection of wavelength deviation.

Figure 6:
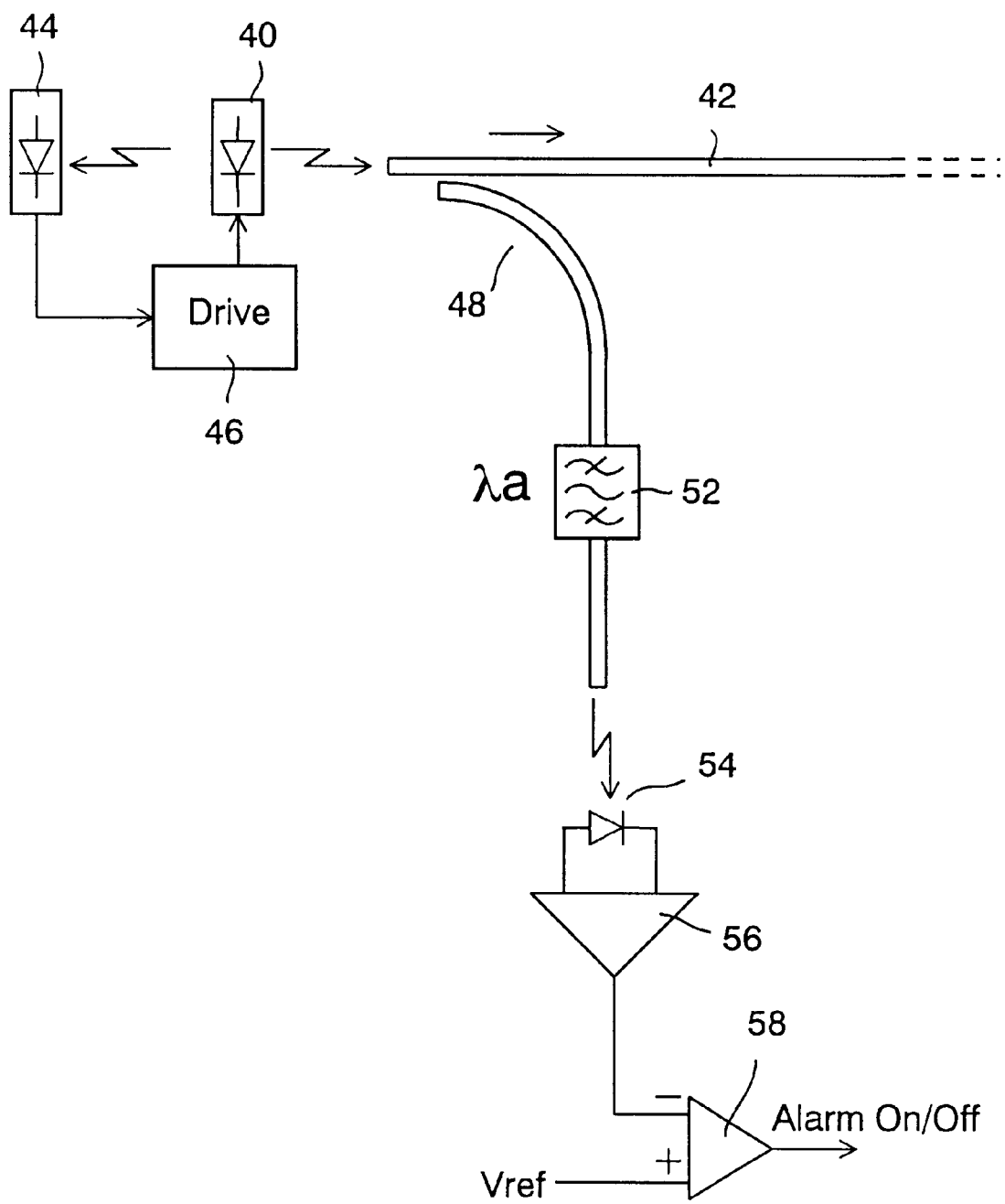
FIG. 6 is a schematic diagram of a second embodiment of the invention.

Also the oscillation characteristics of the semiconductor laser including, in particular, the characteristics of the optical output intensity relative to the drive current vary with time. In applications where it is desired or preferable to restrict changes in optical intensity within a certain range, means for stabilizing the optical output intensity of the laser source by feedback control may be provided. For a laser source of this type, detection of the laser optical intensity for monitoring wavelengths can be omitted. FIG. 6 shows a general construction of an embodiment having means for stabilizing the optical output intensity.

Explanation is made on FIG. 6. Numeral 40 denotes a laser source which may be a laser element alone, or may include an optical modulator element for modulating optical output of the laser element and/or another optical device, like the laser source 10. First optical output of the laser source 40 is introduced to a long-distance optical transmission medium such as optical fiber, not shown, via an optical transmission line 42. Second optical output from the other end surface of the laser source 40 is applied to a pin photodiode 44, and output of the pin photodiode 44 is applied to a drive circuit 46 for driving the laser element of the laser source 40. The drive circuit 46 drives the laser element of the laser source 40 such that the output level of the pin photodiode 44 be kept at a predetermined value. The continuous light intensity of the laser source 40 is maintained at a predetermined value by feedback control by the pin photodiode 44 and the drive circuit 46.

The optical signal travelling through the optical transmission line 42 is partly branched by a directional coupler 47, and applied to a pin photodiode 54 via an optical filter 52. The optical filter 52, like the optical filter 24, is an optical element whose transmittance becomes a peak at a specific wavelength $\lambda$a and decreases as the wavelength deviates from $\lambda$a. If reflective light by the optical filter 52 is not negligible, an optical isolator may be provided between the optical filter 52 and the directional coupler 48.

The pin photodiode 54 converts the optical output of the optical filter 52 into an electric signal, and an logarithmic amplifier 56 logarithmic-amplifies the output of the pin photodiode 54. A comparator 58 compares the output voltage of the logarithmic amplifier 56 with the alarm or warning threshold Vref. When the output voltage of the logarithmic amplifier 56 is Vref or higher, An alarm-off signal is output. When the output voltage of the logarithmic amplifier 56 decreases below Vref, an alarm-on signal is output.

Also in the embodiment shown in FIG. 6, like the embodiment of FIG. 5, if the laser source 40 includes a modulation element, since a modulated optical signal enters in the pin photodiode 54, affection of any intensity variation by modulation must be removed. For this purpose, for example, the output signal of the photodiode 54 may be applied to the logarithmic amplifier 28 after sample-holding it in synchronism with the modulation signal of the laser source 40.

Although the embodiments shown above use the directional couplers 14, 20, 34 to divide optical signals, a beam splitter may be used in lieu of them.

Figure 7:
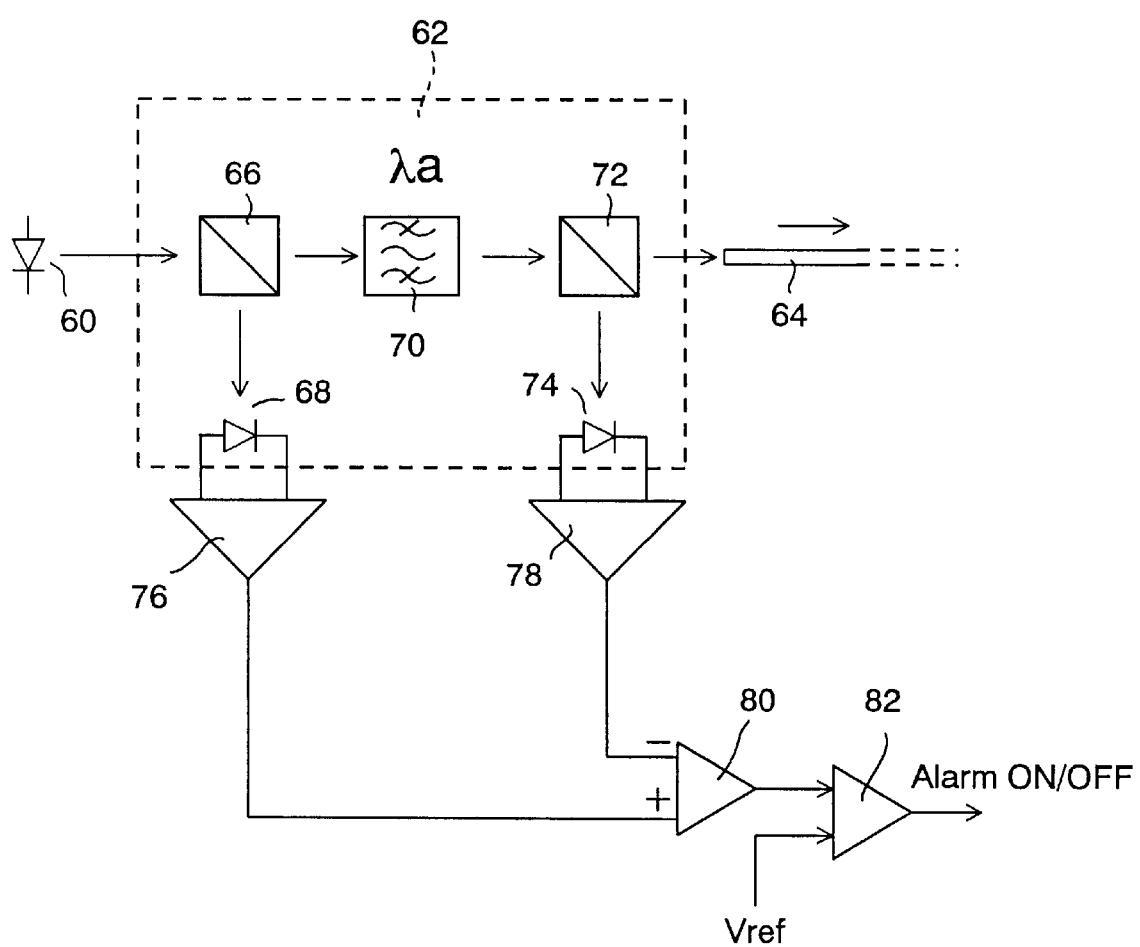
FIG. 7 is a schematic diagram of a first embodiment of the invention using a beam splitter.

FIG. 7 is a schematic block diagram showing a general construction of a modified embodiment which uses beam splitters instead of the directional couplers 14 and 34 used in the embodiment shown in FIG. 4.

Numeral 60 denotes a laser source similar to the laser source 10, which may be a laser element alone, or may include an optical modulator element for modulating optical output of the laser element and/or another optical device. Optical output of the laser source 60 is applied to an optical fiber 64 for transmission via a wavelength monitoring optical unit 62.

In the optical unit 62, a beam splitter 66 divides the laser beam from the laser source 60 into two. One of the divisional optical signals from the beam splitter 66 is introduced into a pin photodiode 68 and converted into an electric signal. The other of the divisional optical signals from the beam splitter 66 is introduced to an optical filter 70 having transmission characteristics that maximize the transmittance at the center wavelength $\lambda$a and decreases the transmittance as the wavelength comes apart from $\lambda$a. Optical output of the optical filter 70 is introduced into a second beam splitter 72 and divided into two. One of divisional optical signals from the beam splitter 72 is introduced to a pin photodiode 74 and converted into an electric signal. The other of the divisional optical signals from the beam splitter 72 enters in the optical fiber 64 as optical output of the optical unit 62.

Divisional ratios of the beam splitters 66 and 72 can be determined as desired. Considering that the optical output of the optical unit 62 is used for signal transmission, the divisional ratio of the beam splitter 66 to the pin photodiode 68 and the divisional ratio of the beam splitter 72 to the pin photodiode 74 are preferably determined as low as 1/10 or less, for example.

Figure 8:
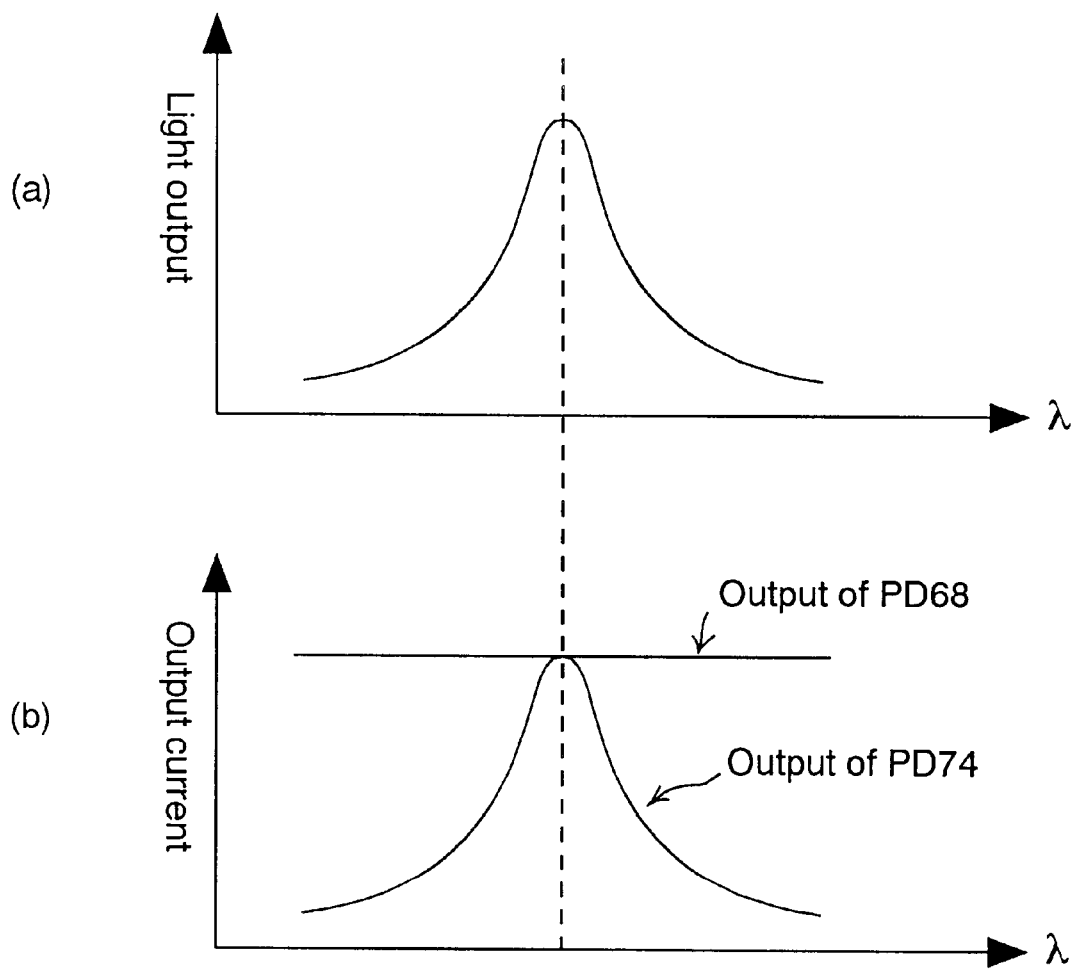
FIG. 8 consisting of FIGS. 8(a) and 8(b), is a diagram showing wavelength characteristics of an optical unit 62 in the embodiment of FIG. 7.

The output level of the pin photodiode 68 or its average level represents the optical output intensity of the laser source 60. Since the light passing through the optical filter 70 enters in the pin photodiode 74, its output level or average level represents the deviation of the optical output wavelength of the laser source 60 from the wavelength $\lambda$a. Outputs of the pin photodiodes 68, 74 are logarithmic-amplified by logarithmic amplifiers 76, 78, respectively, to expand the measurement dynamic range. Also in this embodiment like the preceding embodiments, normal linear amplification is acceptable. Gains of the logarithmic amplifiers 76, 78 are adjusted such that the output levels of the logarithmic amplifiers 76, 78 coincide when the optical output wavelength of the laser source 60 is $\lambda$a. FIG. 8 shows changes in optical output intensity of the optical unit 62 and in output current of the pin photodiodes 68, 74 when the wavelength of incident light to the optical unit 62 is scanned around $\lambda$a.

Output of the logarithmic amplifier 76 is connected to the noninverted input of a differential amplifier 80, and output of the logarithmic amplifier 78 is connected to the inverted input of the differential amplifier 78. Therefore, the output level of the differential amplifier 80 corresponds to a value resulting from subtracting the output level of the logarithmic amplifier 78 from the output level of the logarithmic amplifier 76. Here again, since both the optical inputs to the pin photodiodes 68, 74 are branched from the same optical signal, their intensity variations are identical. As a result, intensity variations of optical outputs from the laser source 60 (typically, intensity variations by modulation) are identical when introduced to the differential amplifier 80, and affection of changes in optical intensity is canceled.

Output of the differential amplifier 80 is applied to one input of the comparator 82 which is also supplied at the other input with a threshold Vref for determination whether an alarm or warning is to be issued or not. Output of the comparator 82 exhibits a low level (alarm-off) when the output level of the differential amplifier 80 is lower than Vref, but becomes a high level (alarm-on) when the output level of the differential amplifier 80 is Vref or higher.

Since (the laser element of) the laser source 60 initially oscillates in $\lambda$a approximately, the output level of the photodiode 68 and the output level of the photodiode 74 coincide approximately. In this status, output of the differential amplifier 80 becomes zero, or very low, and the output level of the comparator 82 is low.

However, when the oscillation wavelength of (the laser element of) the laser source 60 gradually deviates from λa due to aged changes or deterioration, for example, the output level of the photodiode 74 decreases in accordance with the amount of wavelength deviation as shown in FIG. 8(b). For easier understanding, let the optical output intensity be constant regardless of any shift in oscillation wavelength of the laser source 60. Since the quantity of light introduced into the photodiode 68 does not vary even when the oscillation wavelength of the laser source 60 deviates from λa, the output level of the photodiode 68 does not change either. Therefore, as the oscillation wavelength of the laser source 60 deviates from the center frequency λa of the optical filter 70, the output voltage level of the differential amplifier 80 increases, and soon becomes Vref or higher. When the output voltage of the differential amplifier 80 increases to Vref or higher, output of the comparator 82 exhibits a high level, and an alarm or warning about the shift of the oscillation wavelength is given to a user. Practically, a light emitting diode is lit, or a buzzer sound is generated.

In the embodiment shown in FIG. 7, the optical signal passing through the optical filter 70 enters in the optical fiber 64. Therefore, the quantity of light introduced to the optical fiber 64 decreases as the oscillation wavelength of (the laser element of) the laser source 60 deviates from λa. In the wavelength-division-multiplex system explained later, when the optical wavelength deviates from a predetermined value, the light had better be not output to the optical transmission line. From this point of view, the embodiment shown in FIG. 7 is suitable for the wavelength-division-multiplex system.

Figure 9:
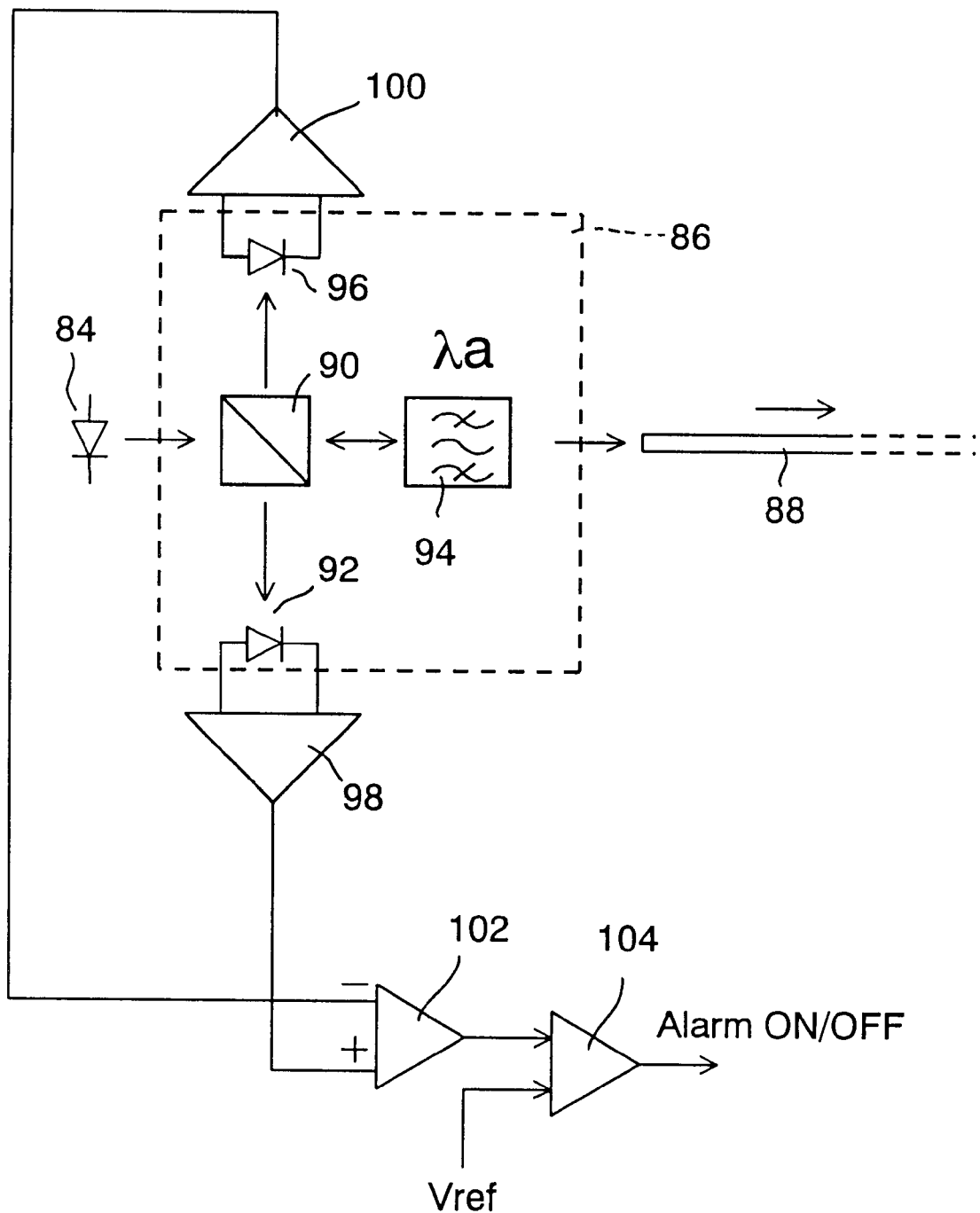
FIG. 9 is a schematic diagram of a second embodiment of the invention using a beam splitter.

FIG. 9 is a schematic block diagram showing a general construction of a second modified embodiment using beam splitters in lieu of the directional couplers 14, 34 used in the embodiment shown in FIG. 4.

Optical output of a laser source 84 similar to the laser source 60 is applied to an optical fiber 88 for transmission via a wavelength monitoring optical unit 86. In the optical unit 86, a beam splitter 90 divides the laser beam from the laser source 84 into two. One of the divisional optical signals from the beam splitter 90 is introduced into a pin photodiode 92 and converted into an electric signal. The other of the divisional optical signals from the beam splitter 90 is introduced to an optical filter 94 having transmission characteristics that maximize the transmittance (minimizes the reflective index) at the center wavelength λa and decreases the transmittance (increases the reflective index) as the wavelength comes apart from λa. The light through the optical filter 94 enters in the optical fiber 88 as optical output of the optical unit 86. The reflective light from the optical filter 94 returns to the beam splitter 90, deflects there by 90 degrees, and enters in a pin photodiode 96.

Figure 10:
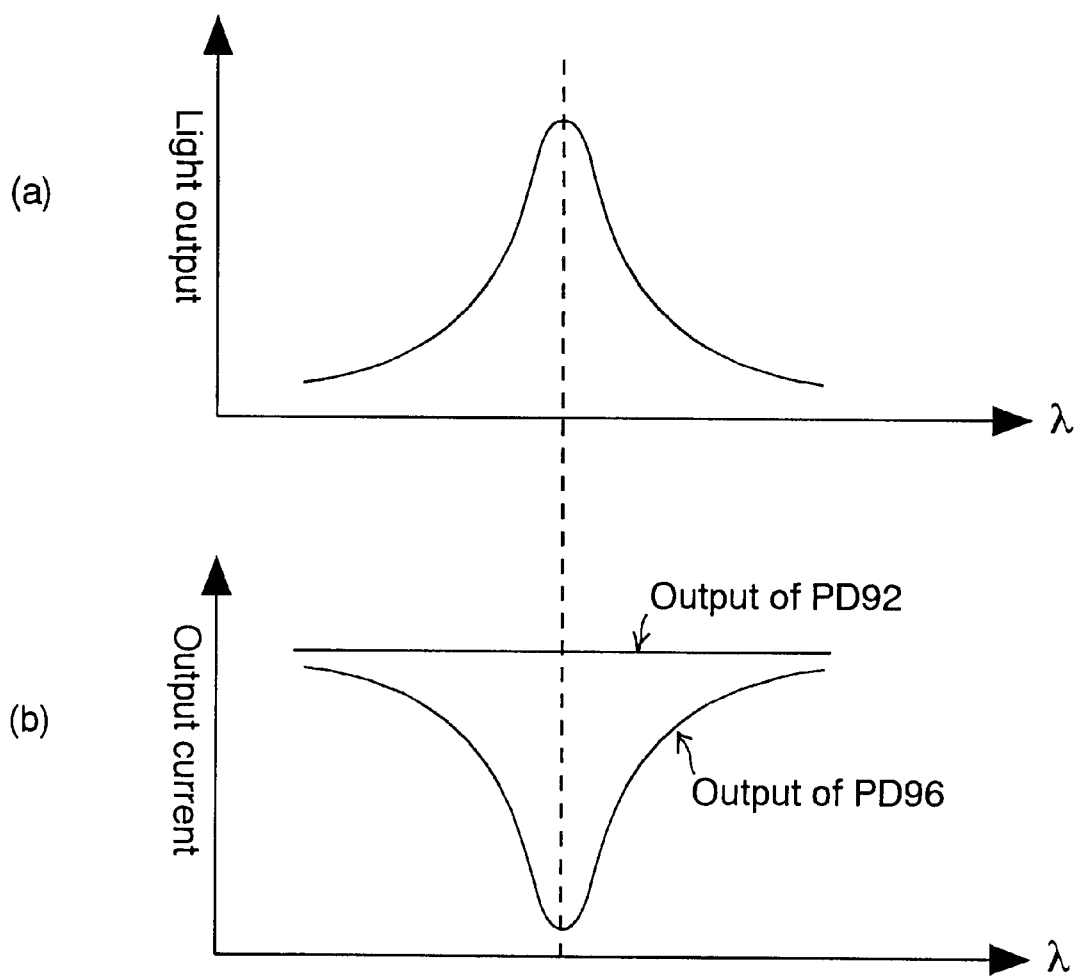
FIG. 10 consisting of FIGS. 10(a) and 10(b), is a diagram of wavelength characteristics of an optical unit 86 in the embodiment of FIG. 9.

The pin photodiodes 92, 96 output currents responsive to the intensities of the incident light. The output level of the pin photodiode 92 or its average level represents the intensity of the optical output from the laser source 84. Since reflective light from the optical filter 94 enters in the pin photodiode 96, its output level or average level represents the deviation of the optical output wavelength of the laser source 60 from the wavelength λa. Unlike the embodiment of FIG. 7, the output current value of the pin photodiode 96 increases as the optical output wavelength of the laser source 84 deviates from the wavelength λa. Outputs of the pin photodiodes 92, 96 are logarithmic-amplified by logarithmic amplifiers 98, 100, respectively, to expand the measurement dynamic range. Also in this embodiment like the preceding embodiments, normal linear amplification is acceptable. Gains of the logarithmic amplifiers 98, 100 are set to similar values. FIG. 10 shows changes in optical output intensity of the optical unit 86 and in output current of the pin photodiodes 92, 96 when the wavelength of incident light to the optical unit 86 is scanned around λa.

Output of the logarithmic amplifier 98 is connected to the noninverted input of a differential amplifier 102, and output of the logarithmic amplifier 100 is connected to the inverted input of the differential amplifier 102. Therefore, the output level of the differential amplifier 102 corresponds to a value resulting from subtracting the output level of the logarithmic amplifier 100 from the output level of the logarithmic amplifier 98. Here again, since both the optical inputs to the pin photodiodes 92, 96 are branched from the same optical signal, their intensity variations are identical. As a result, intensity variations of optical outputs from the laser source 84 (typically, intensity variations by modulation) are identical when introduced to the differential amplifier 102, and affection of changes in optical intensity is canceled.

Output of the differential amplifier 102 is applied to one input of the comparator 104 which is also supplied at the other input with a threshold Vref for determination whether an alarm or warning is to be issued or not. Output of the comparator 104, unlike the comparator 82, exhibits a low level (alarm-off) when the output level of the differential amplifier 102 is Vref or higher, but becomes a high level (alarm-on) when the output level of the differential amplifier 102 is lower than Vref.

Since (the laser element of) the laser source 84 initially oscillates in λa approximately, the output level of the photodiode 96 becomes very low as compared with the output level of the photodiode 92, and the output level of the differential amplifier 102 increases to Vref or higher. Therefore, the output level of the comparator 104 is low.

However, when the oscillation wavelength of (the laser element of) the laser source 84 gradually deviates from λa due to aged changes or deterioration, for example, the output level of the photodiode 96 increases in response to the amount of wavelength deviation as shown in FIG. 10(b). Here again, for easier understanding, let the optical output intensity be constant regardless of any shift in oscillation wavelength of the laser source 84. Since the quantity of light introduced into the photodiode 92 does not vary even when the oscillation wavelength of the laser source 84 deviates from λa, the output level of the photodiode 92 does not change either as shown in FIG. 10(b). Therefore, as the oscillation wavelength of the laser source 84 deviates from the center frequency λa of the optical filter 94, the output voltage level of the differential amplifier 102 decreases, and soon becomes lower than Vref. When the output voltage of the differential amplifier 102 decreases below Vref, output of the comparator 104 exhibits a high level, and an alarm or warning about the shift of the oscillation wavelength is given to a user. Practically, a light emitting diode is lit, or a buzzer sound is generated.

In the embodiments shown in FIGS. 7 and 9, the optical signals passing through the optical filters 70, 94 of the optical units 62, 86 enter in the optical fibers 64, 88. Therefore, the quantities of light introduced to the optical fibers 64, 88 decrease as the oscillation wavelengths of (the laser elements of) the laser sources 60, 84 deviate from λa. In the wavelength-division-multiplex system explained later, when the optical wavelength deviates from a predetermined value, the light had better be not output to the optical transmission line. From this point of view, the embodiments shown in FIGS. 7 and 9 are suitable for the wavelength-division-multiplex system. Moreover, since the optical units 62, 86 for monitoring wavelengths may be in form of an optical planer circuit, they can be easily incorporated into a unit and miniaturized.

Next explained is an embodiment applied to a wavelength-division-multiplex transmission system.

Figure 11:
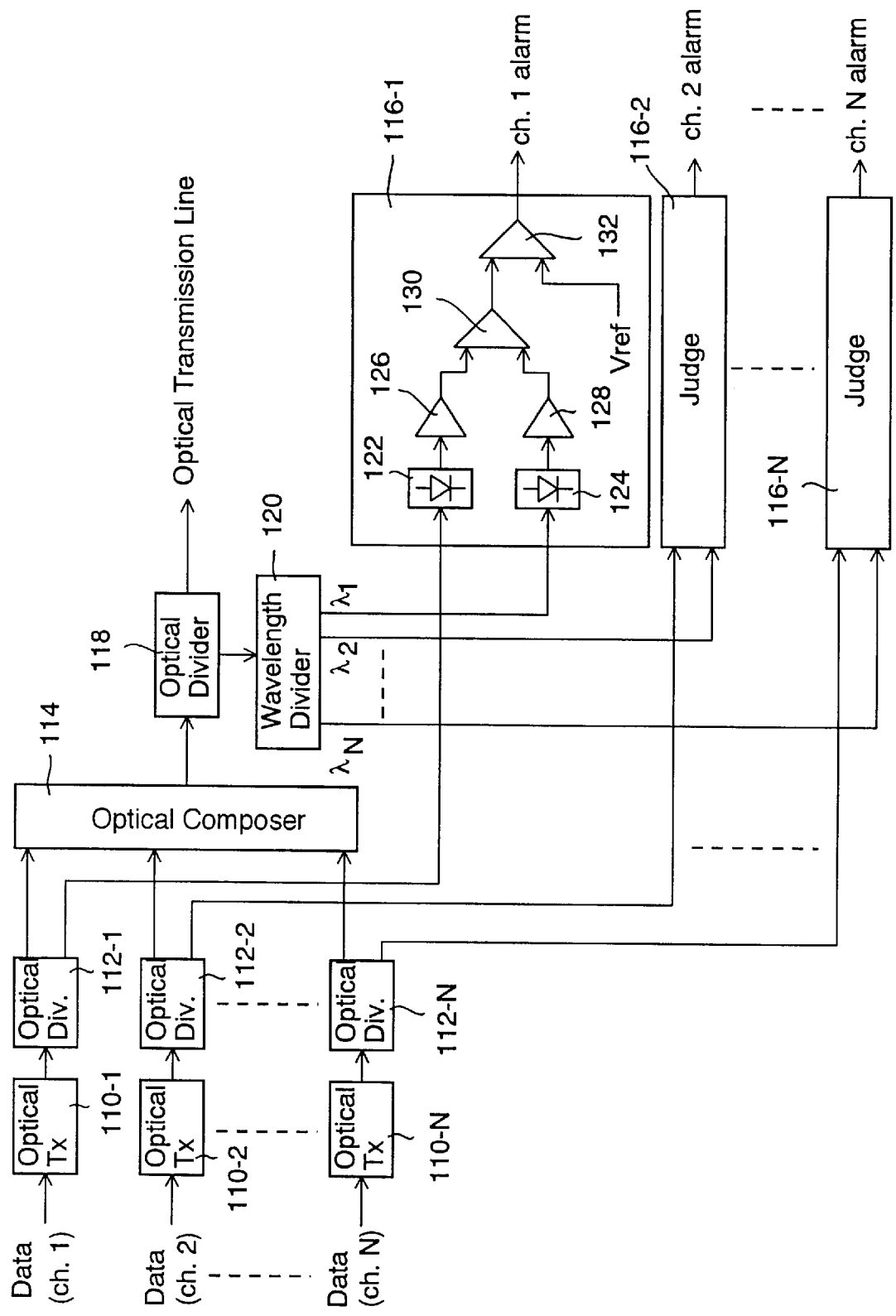
FIG. 11 is a schematic block diagram of a first embodiment of the invention applied to a wavelength-division-multiplex optical transmission system.

FIG. 11 is a block diagram showing a general construction of a first embodiment applied to a wavelength-division-multiplex transmission system. Explanation made on the construction and behaviors of the embodiment shown in FIG. 11. Numerals 110-1, 110-2, . . . 110-N denote optical transmitters which output optical signals intensity-modulated in accordance with input data. They respectively include laser elements for continuous oscillation in different optical wavelengths $\lambda_1, \lambda_2, \ldots \lambda_N$ in individual channels and modulator elements for modulating the laser optical outputs in accordance with input data. Optical dividers 112-1, 112-2, . . . 112-N divide each of optical outputs of the optical transmitters 110-1, 110-2, . . . 110-N into two parts, and supply one of them to an optical composer 114 and the other to the to the judging circuits 116-1, 116-2, . . . 116-N.

The optical composer 114 composes output signals from the optical dividers 112-1, 112-2, . . . 112-N. Output of the optical composer 114 corresponds to a result of wavelength-division-multiplexing of optical signals whose wavelengths are $\lambda_1, \lambda_2, \ldots \lambda_N$. An optical divider 118 divides the optical output of the optical composer 114 into two, and supplies one to the optical transmission line (optical fiber transmission line) and the other to a wavelength divider 120.

Figure 12:
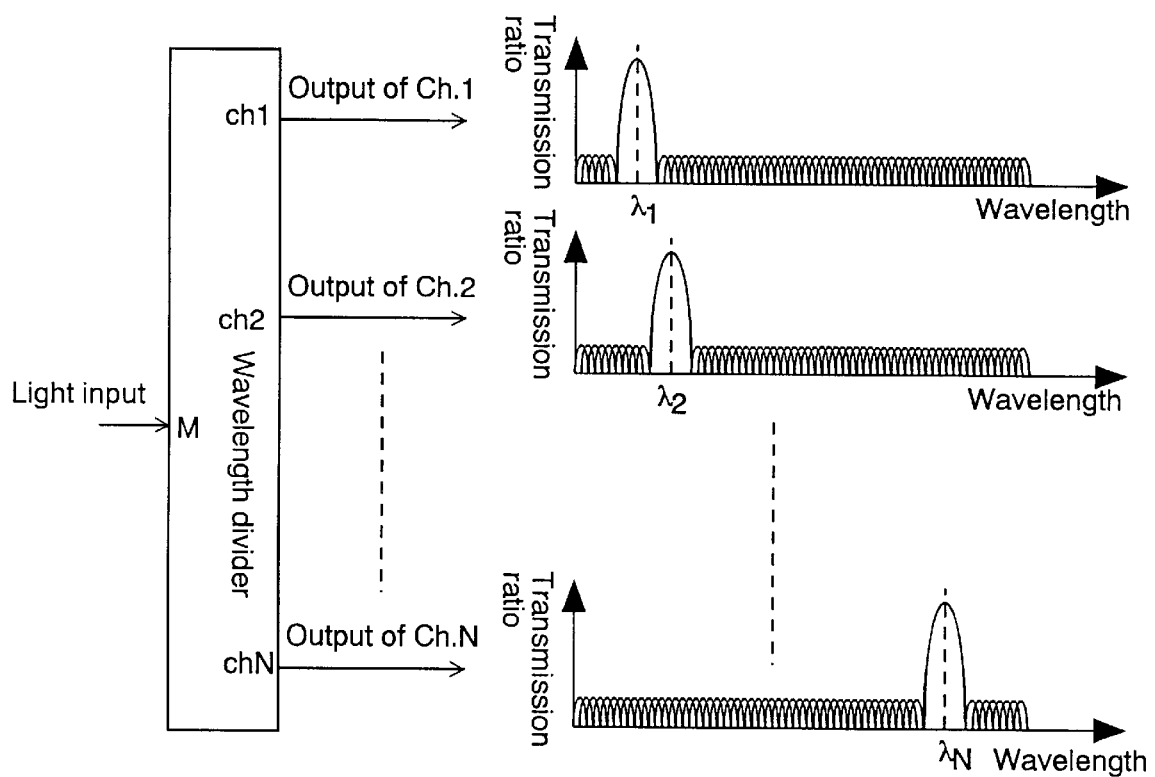
FIG. 12 is a diagram of transmission characteristics of output ports of a wavelength composer 120.

The wavelength divider 120 is an optical element which outputs the incoming optical signal by dividing it to wavelengths $\lambda_1, \lambda_2, \ldots \lambda_N$. FIG. 12 shows transmission characteristics of individual output ports of the wavelength divider 120. Channels 1 through N for the wavelengths $\lambda_1, \lambda_2, \ldots \lambda_N$ have transmission characteristics maximizing the transmittance at the wavelengths $\lambda_1, \lambda_2, \ldots \lambda_N$ and decreasing the transmittance as the wavelength deviates from these values. Fundamentally, an optical element of this type may be an element having a parallel arrangement of optical filters for extracting and separating respective wavelengths $\lambda_1, \lambda_2, \ldots \lambda_N$ or an optical element sequentially separating individual wavelengths $\lambda_1, \lambda_2, \ldots \lambda_N$. Especially, an arrayed waveguide grating composer/divider capable of efficiently separating a number of wavelengths as close as 0.8 nm through 1.0 nm by using multi-flux interference may be used (Masao Kawauchi, "Trend of Studies on Quartz-based Planar Optical Wave Circuits", Journal of the Institute of Electronics Information & Communication Engineers, Vol. 78, No. 9, pp 883–886, see page 884 of September 1995).

Figure 13:
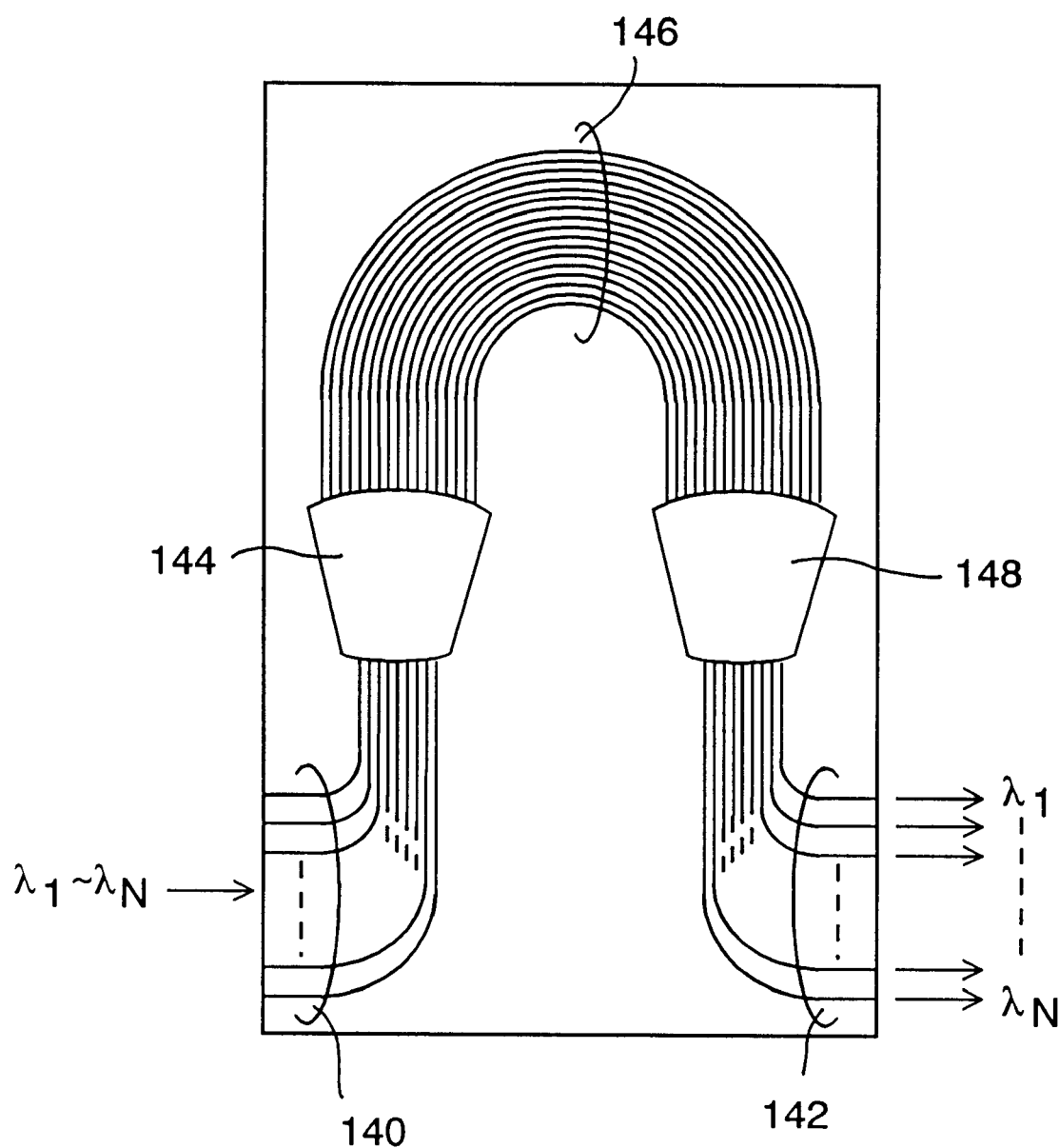
FIG. 13 is a plan view of an N×N-arrayed waveguide grating composer/divider.

FIG. 13 is a plan view of an N×N-arrayed waveguide grating composer/divider. The N×N-arrayed waveguide grating composer/divider typically includes N input waveguides 140 and N output waveguides 142, and beams of light introduced to the input waveguides 140 are distributed in equal phases to individual waveguides with the optical path length difference ΔL in the waveguide array 146 by diffraction in a first sectorial slab waveguide 144. Beams of light propagating in the waveguide array 146 enter in a second sectorial slab waveguide 148. Due to the optical path length difference ΔL given in the waveguide array 146, multi-flux interference occurs in the second sectorial slab waveguide 148, and individual wavelength components are collected to corresponding output waveguides 142. As a result, when a wavelength-division-multiplexed signal including components of wavelengths $\lambda_1$ to $\lambda_N$ is introduced to the central input port (M port) among N input ports, namely, the central input waveguide among N input waveguides 140, optical signals having different wavelengths $\lambda_1, \lambda_2, \ldots \lambda_N$ are output from N output port of the output waveguides 142. If, in contrast, optical signals of wavelengths $\lambda_1$ to $\lambda_N$ are input to corresponding output ports, an optical signal resulting from wavelength-multiplexing the optical signals with wavelengths $\lambda_1, \lambda_2, \ldots \lambda_N$ input to the output ports is output from the center channel (M port) among the input ports.

All judging circuits 116-1, 116-2, . . . 116-N have an identical construction. More specifically, the construction is the same as the portion made from the photodiodes 16, 26, logarithmic amplifiers 18, 28, differential amplifier 30 and comparator 32 of FIG. 1. The interior construction is illustrated only for the judging circuit 116-1.

Behaviors of the embodiment shown in FIG. 11 is explained. Laser elements contained in the optical transmitters 110-1 to 110-N initially oscillate in $\lambda_1$ to $\lambda_N$. However, the oscillation wavelengths gradually deviate from $\lambda_1$ to $\lambda_N$ due to aged changes or deterioration, for example. Optical outputs from the optical transmitters 110-1 to 110-N are each divided into two by optical dividers 112-1 to 112-N. One of them is introduced into the optical composer 114, and the other is introduced to a pin photodiode 122 in each of the judging circuits 1161-1 to 116-N. The optical composer 114 composes (wavelength-division-multiplexes) optical signals from channels 1 through N, and supplies its output to the optical divider 118. The optical divider 118 divides the wavelength-division-multiplexed optical signal of $\lambda_1$ to $\lambda_N$ from the optical composer 114 into two, and applies one to the optical transmission line and the other to the wavelength divider 120.

The wavelength divider 120 separates the wavelength-division-multiplexed optical signal from the optical divider 118 into individual wavelength components $\lambda_1$ to $\lambda_N$ according to its wavelength division characteristics, and supplies respective components to the judging circuits 116-1 to 116-N. If the oscillation wavelengths of laser elements of the optical transmitters 110-1 to 110-N deviate from $\lambda_1$ to $\lambda_N$, then the wavelength divider 120 attenuates the optical signals of respective channels by amounts responsive to the wavelength deviations, and then outputs them from respective wavelength output ports.

Behaviors of the judging circuit 116-1 are explained below in greater detail. Introduced to the pin photodiode 122 is an optical signal which is one of two parts divided by the optical divider 112-1. Introduced to another pin photodiode 124 is an optical signal output from the $\lambda_1$ output port of the wavelength divider 120. The photodiodes 122, 124 convert their input optical signals into electrical signals. The output level of the photodiode 122 or its average level represents the optical output intensity of the optical transmitter 110-1, and the output level of the photodiode 124 or its average level represents the offset value of the optical output wavelength of the optical transmitter 110-1 from the wavelength $\lambda_1$.

Outputs of the photodiodes 112, 124 are logarithmic-amplified by logarithmic amplifiers 126, 128, and then applied to a differential amplifier 130. Like the preceding embodiments, the logarithmic amplifiers 126, 128 are used for the purpose of expanding the measurement dynamic range, but, if it is not necessary, they may be replaced by linear amplifiers. The differential amplifier 130 outputs a signal corresponding to the difference between outputs of the logarithmic amplifiers 126, 128, and a comparator 132 compares the output voltage of the differential amplifier 130 with the threshold voltage Vref, a reference value for generating an alarm or warning. The output level of the comparator 132 is low (alarm-off) when the output level of the differential amplifier 130 is lower than Vref, but high (alarm-on) when the output level of the differential amplifier 130 is Vref or higher.

Initially, since the laser element contained in the optical transmitter 110-1 oscillates in $\lambda_1$ the output level of the photodiode 122 and the output level of the photodiode 124 coincide substantially. In this status, the output level of the differential amplifier 130 is zero or very low, and the output level of the comparator 132 is low.

However, as the oscillation wavelength of the laser element contained in the optical transmitter 110-1 gradually deviates from $\lambda_1$ due to aged changes or deterioration, for example, the optical output intensity of the $\lambda_1$ output port of the wavelength divider 120 decreases in response to the wavelength deviation, and the output level of the photodiode 124 decreases accordingly. Here again, for easier understanding, let the optical output intensity be constant in the optical transmitter 110-1 regardless of any shift in its oscillation wavelength. Since the quantity of light introduced into the photodiode 122 does not vary even when the oscillation wavelength of the laser element in the optical transmitter deviates from $\lambda_1$ the output level of the photodiode 122 does not change either. Therefore, as the oscillation wavelength of the laser element in the optical transmitter 110-1 deviates from the center frequency $\lambda_1$, the output voltage level of the differential amplifier 130 increases, and soon becomes Vref or higher.

When the output voltage of the differential amplifier 130 increases to Vref or higher, output of the comparator 132 exhibits a high level, and an alarm or warning about the shift of the oscillation wavelength in the optical transmitter 110-1 is given to a user. Practically, a light emitting diode is lit, or a buzzer sound is generated.

The above explanation also applies to the other transmitters 110-2, . . . 110-N and judging circuits 116-2, . . . 116-N. That is, when the oscillation wavelengths of the optical transmitters 110-2, . . . 110-N deviate a certain amount from $\lambda_2$, . . . $\lambda_N$, the judging circuits 116-2, . . . 116-N call observer's attention to the shift in oscillation wavelength.

If the optical output intensities of the optical transmitters 110-1 through 110-N are stabilized as shown in FIG. 6, optical dividers 112-1 to 112-N are not required, and, needless to say, the judging circuits 116-1 to 116-N can be simplified like the construction in FIG. 6.

Figure 14:
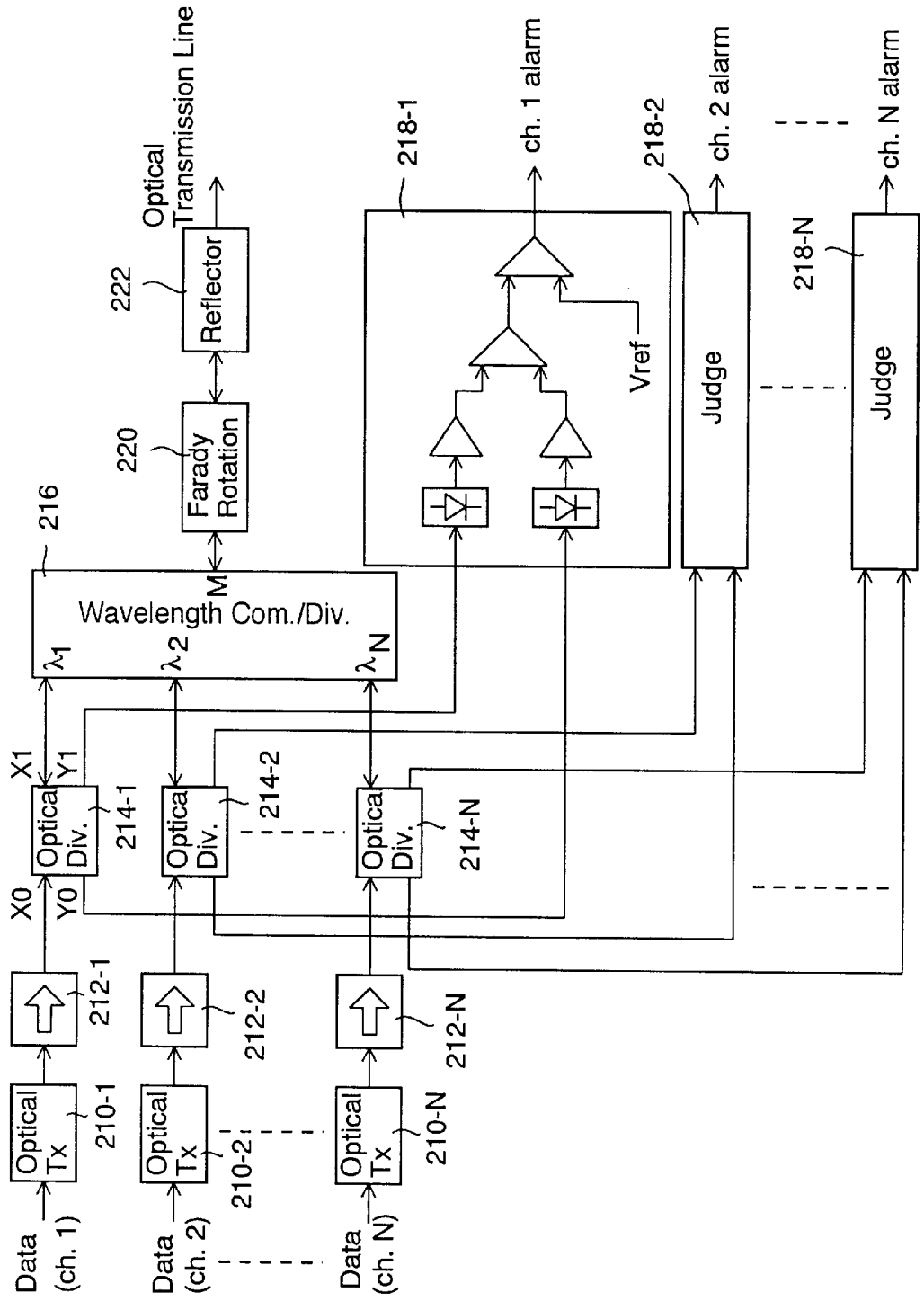
FIG. 14 is a schematic block diagram of a second embodiment of the invention applied to a wavelength-division-multiplex optical transmission system.

FIG. 14 is a block diagram showing a general construction of a second embodiment applied to a wavelength-division-multiplex transmission system.

Numerals 210-1, 210-2, . . . 210-N denote optical transmitters, like the optical transmitters 110-1, 110-2, . . . 110-N, which output optical signals intensity-modulated in accordance with input data. They respectively include laser elements for continuous oscillation in different optical wavelengths $\lambda_1, \lambda_2, \ldots \lambda_N$ in individual channels and modulator elements for modulating the laser optical outputs in accordance with input data. Optical outputs from the optical transmitters 210-1, 210-2, . . . 210-N are introduced to ports X0 of 2×2 optical dividers 214-1, 214-2, . . . 214-N through optical isolators 212-1, 212-2, . . . 212-N, respectively. Each of the optical dividers 214-1, 214-2, . . . 214-N is an optical element that divides light introduced to the ports X0 to output them from ports X1 and Y1, and divides light introduced to the port X1 to output them from ports X0 and Y0.

The ports X1 of the optical dividers 214-1, 214-2, . . . 214-N are connected to wavelength ports of the wavelength composer/divider 216 for inputting and outputting wavelength components of $\lambda_1, \lambda_2, \ldots \lambda_N$ respectively. The wavelength composer/divider 216 is the composer/divider of arrayed waveguide grating type explained with reference to FIG. 13. Optical signals output from ports Y1 of the optical dividers 214-1, 214-2, . . . 214-N are applied to judging circuits 218-1, 218-2, . . . 218-N structurally identical to the judging circuits 116-1, 116-2, . . . 116-N as optical signals for detecting optical intensity references. Optical signals output from ports Y0 of the optical dividers 214-1, 214-2, . . . 214-N are applied to judging circuits 218-1, 218-2, . . . 218-N, which are structurally identical to the judging circuits 116-1, 116-2, . . . 116-N as optical signals indicating amounts of wavelength deviation from the wavelengths $\lambda_1, \lambda_2, \ldots \lambda_N$ (attenuated in response to amounts of wavelength deviation).

A multiplex signal port M for input and output of the wavelength-division-multiplex optical signal from the wavelength composer/divider 216 is connected to an optical transmission line (optical fiber) via a Faraday rotating element 220 for rotating the plane of polarization by 45 degrees and a reflective element 222 having a low reflective index independent from the wavelength. The reflective element 222 may be an optical fiber grating having a low reflective index and a wide reflective wavelength width or an 1×2 optical divider having a non-equal branching ratio and having a mirrored branch port end made by vapor deposition, for example. When the latter element is used, reflection corresponding to a fraction of the square value of the branching ratio can be obtained.

Figure 15:
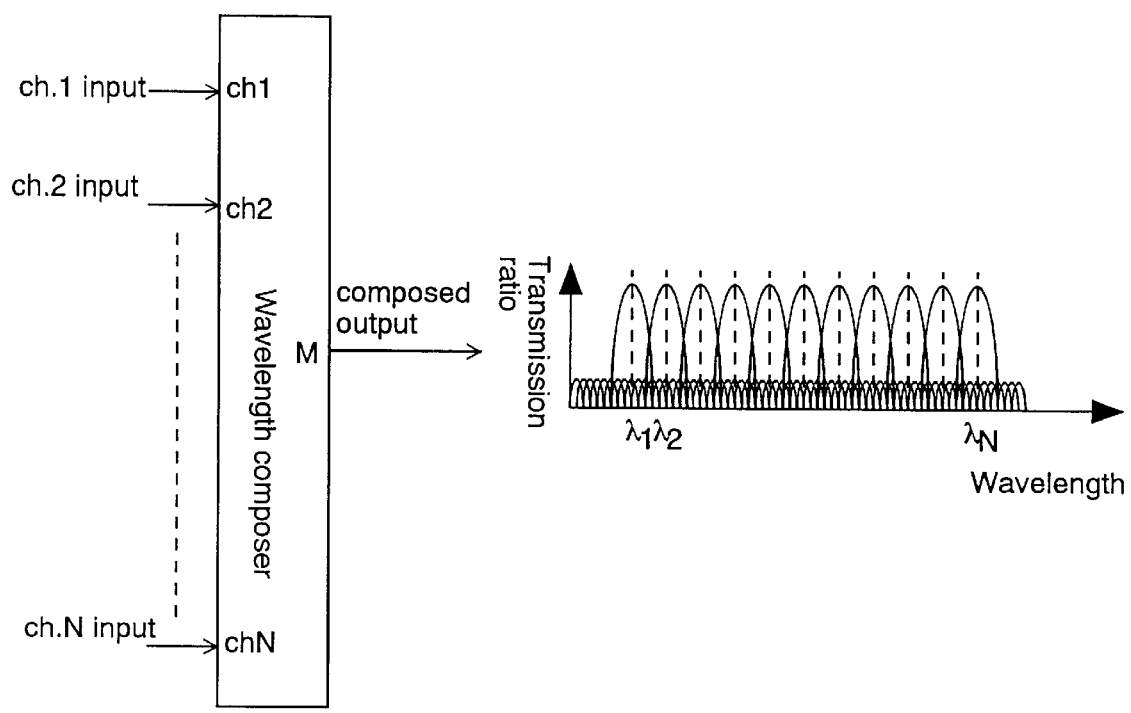
FIG. 15 is a diagram of transmission characteristics of a wavelength composer/divider 216 during operation as a wavelength composer.

FIG. 15 shows transmission characteristics of the wavelength composer/divider 216 while behaving as a wavelength composer.

Behaviors of the embodiment shown in FIG. 14 are explained. Although the laser elements contained in the optical transmitters 210-1 through 210-N initially oscillate in $\lambda_1$, through $\lambda_N$, their wavelengths gradually deviate from $\lambda_1$ to $\lambda_N$ due to aged changes or deterioration. Optical outputs from the optical transmitters 210-1 through 210-N are introduced to X0 ports of the optical dividers 214-1 to 214-N through the optical isolators 212-1 to 212-N, and each divided into two and output from ports X1 and ports Y1. Optical outputs from X1 ports of the optical dividers 214-1 to 214-N are applied to the wavelength composer 216 and wavelength-multiplexed there according to the characteristics shown in FIG. 15. As the optical output wavelengths of the optical transmitters 210-1 through 210-N deviate from $\lambda_1$ to $\lambda_N$, attenuation is increased when the wavelength composer/divider wavelength-multiplexes the optical signals from X1 ports of the optical dividers 214-1 to 214-N.

The optical signal resulting from wavelength multiplexing by the wavelength composer/divider 216, namely, the wavelength-division-multiplexed optical signal, is applied to the Faraday rotating element 220 from the M port, and introduced to the reflective element 222 after its plane of polarization is rotated by 45 degrees. Although the reflective element 222 reflects a small part of the incident light back to the rotation element 220, but outputs most part of the incident light to the optical transmission line. The light reflected by the reflective element 222 is rotated in plane of polarization by 45 degrees in the Faraday rotating element 220, and then introduced to the M port of the wavelength divider 216. Since the light is rotated in plane of polarization by 90 degrees in total after passing the Faraday rotating element 222 twice, it can be prevented that any reflective light entering the M port of the composer/divider 216 from the Faraday rotating element 220 interferes the optical signals exiting from the optical dividers 214-1 to 214-N and travelling through the composer/divider 216 toward the Faraday rotating element 220.

The wavelength composer/divider 216 wavelength-divides the reflective light entering the M port according to the transmission characteristics shown in FIG. 12, and supplies respective parts from wavelength ports corresponding to $\lambda_1$ to $\lambda_N$ toward the X1 ports of the optical composers 214-1 to 214-N. Here again, if the optical output wavelengths of the optical transmitters 210-1 to 210-4 deviate from $\lambda_1$ to $\lambda_N$, optical outputs of the respective wavelength ports are attenuated in response to the amounts of wavelength deviation.

Each of the optical dividers 214-1 to 214-N divides the light introduced to its X1 port into two, and supplied one from the X0 port to one of the optical isolators 212-1 to 212-N and the other from the Y0 port to one of the judging circuits 218-1 to 218-N. The optical isolators 212-1 to 212-N adsorbs light from X1 ports of the optical dividers 214-1 to 214-N, and prevents that the reflective light from the reflective element 222 adversely affects the behaviors of the optical transmitters 210-1 to 210-N.

In this manner, introduced to the judging circuit 218-1 to 218-N are beams of light that represent the optical output intensities of the optical transmitters 210-1 to 210-N and beams of light attenuated in accordance with deviations of optical output wavelengths of the optical transmitters 210-1 to 210-N from $\lambda_1$ to $\lambda_N$. In the embodiment shown in FIG. 11, attenuation is once by once passing the signals through the wavelength divider 120. In the embodiment of FIG. 14, however, attenuation is made twice by reciprocally passing the signals through the wavelength composer/divider 216, and results in as much larger attenuation with respect to the wavelength deviations. Each of the judging circuits 218-1 to 218-N, identically to the judging circuits 116-1 to 116-N, compares the difference between two optical input intensities with the threshold Vref, and outputs an alarm signal when detecting a wavelength deviation larger than a predetermined value. In response to the alarm signal, a light emitting diode is lit, or a buzzer sound is generated, for example.

In the embodiment shown in FIG. 14, also when any of the optical transmitters 210-1 to 210-N issues light in a wavelength band assigned to the other channels due to some malfunction, transmission characteristics of the wavelength composer/divider 216 can significantly alleviate adverse affection to the other channels. Moreover, wavelength composing and wavelength division can be attained with a single optical element.

Optical filters 24, 52, wavelength divider 120 and wavelength composer/divider 216 used in the above embodiments are passive elements less subject to aged changes or deterioration. That is, since they are less liable to change in characteristics, they are suitable for reliably monitoring wavelengths over a long period of time.

As apparent from the above explanation, since the apparatus according to the invention needs no movable elements, such as wavemeter or optical spectrum analyzer, it ensures a high reliability over a long period of time.

Although a apparatus using a wavemeter or an optical spectrum analyzer requires data processing of measured values by using a microprocessor or other appropriate element, the present invention does not. Additionally, although the conventional apparatus may become inoperative for monitoring when data processing of measured values is interrupted, the present invention has no such defect, and is highly reliable also in this respect.

Since the invention needs no high-frequency parts or elements in its light detective means and electric circuit, a very economical apparatus can be obtained.

More specifically, by using wavelength divider means or wavelength composer/divider means capable of dividing a plurality of wavelengths, a wavelength-division-multiplex optical signal can be wavelength-separated collectively, and wavelengths of different channels can be monitored simultaneously. The use of passive elements as optical elements promises stable wavelength characteristics over a long time and ensures a high reliability. It is another factor promising a high reliability that the electric element may be of a slow speed. By comparing the intensities of wavelength-separated beams of light with the intensities of light before wavelength separation, any shift in wavelength can be detected without problems even when any change occurs in optical intensity. By logarithmic-amplifying the detected optical intensities, the measurable dynamic range can be extended. The use of light other than that for information transmission can prevent a decrease of the intensity of the light for information transmission.

What is claimed is:

1. An optical wavelength monitoring apparatus, comprising:

an optical filter for passing a predetermined wavelength band;

optical detecting means for converting an optical output of said optical filter into an electrical signal, said optical detecting means comprising a light receiving element for converting the optical output of said optical filter into an electrical signal, and logarithmic amplifying means for logarithmic-amplifying an output signal of said light receiving element; and comparing means for comparing an output level of said optical detecting means with a predetermined level.

2. An optical wavelength monitoring apparatus for monitoring the wavelength of a laser source, comprising:

an optical filter for passing a predetermined wavelength band having a predetermined frequency in the center thereof and for introducing an optical signal obtained from an optical output of said laser source;

first optical detecting means for converting an optical output of said optical filter into an electrical signal, said first optical detecting means including a first light receiving element for converting the optical output of said optical filter into an electrical signal, and first logarithmic amplifying means for logarithmic-amplifying an output signal from said first light receiving element;

second optical detecting means for detecting an optical signal representing an optical output intensity of said laser source and for converting it into an electrical signal, said second optical detecting means including a second light receiving element for converting the optical signal representing the optical output intensity of said laser source, and second logarithmic amplifying means for logarithmic-amplifying an output signal of said second light receiving element;

differential means for calculating a difference between an output level of said first optical detecting means and an output level of said second optical detecting means; and comparing means for comparing an output level of said differential means with a predetermined level;

wherein said first and second logarithmic amplifying means comprises gains which are determined to substantially equalize output levels of said first and second logarithmic amplifying means when the optical output of said laser source has said predetermined wavelength.

3. An optical wavelength monitoring apparatus for monitoring the wavelength of a laser source, comprising:

an optical filter for passing a predetermined wavelength band having a predetermined frequency in the center thereof and for introducing an optical signal obtained from an optical output of said laser source;

first optical detecting means for converting an optical output of said optical filter into an electrical signal;

second optical detecting means for detecting an optical signal representing an optical output intensity of said laser source and for converting it into an electrical signal;

differential means for calculating a difference between an output level of said first optical detecting means and an output level of said second optical detecting means;

comparing means for comparing an output level of said differential means with a predetermined level; and first optical dividing means for dividing the optical output of said laser source and supplying divisional light to said optical filter;

wherein said laser source has two optical output portions, and said optical output comprises light that is output from one of said optical output portions from which light other than that used for information transmission is output.

4. An optical wavelength monitoring apparatus for monitoring the wavelength of a laser source, comprising:

an optical filter for passing a predetermined wavelength band having a predetermined frequency in the center thereof and for introducing an optical signal obtained from an optical output of said laser source;

first optical detecting means for converting an optical output of said optical filter into an electrical signal;

second optical detecting means for detecting an optical signal representing an optical output intensity of said laser source and for converting it into an electrical signal;

differential means for calculating a difference between an output level of said first optical detecting means and an output level of said second optical detecting means;

comparing means for comparing an output level of said differential means with a predetermined level; and optical dividing means for dividing the optical output of said laser source and supplying divisional light to said second optical detecting means;

wherein said laser source has two optical output portions, and said optical output comprises light that is output from one of said optical output portions from which light other than that used for information transmission is output.

5. An optical wavelength monitoring apparatus for monitoring the wavelength of a laser source having two optical output portions, comprising:

an optical filter for passing a predetermined wavelength band having a predetermined frequency in the center thereof and for introducing an optical signal obtained from an optical output of said laser source;

first optical detecting means for converting an optical output of said optical filter into an electrical signal;

second optical detecting means for detecting an optical signal representing an optical output intensity of said laser source and for converting it into an electrical signal;

differential means for calculating a difference between an output level of said first optical detecting means and an output level of said second optical detecting means;

comparing means for comparing an output level of said differential means with a predetermined level;

first optical dividing means for dividing light from one of said optical output portions of said laser source and for supplying divisional light to said optical filter; and second optical dividing means for dividing light from one of said optical output portions of said laser source and for supplying divisional light to said second optical detecting means;

wherein said first and second optical dividing means divide light from different said optical output portions.

6. An optical wavelength monitoring apparatus for monitoring individual wavelengths of different light sources of a wavelength-division-multiplex optical transmission system, comprising:

first optical dividing means for dividing each one of optical outputs from a plurality of optical transmitters to which different optical wavelengths are assigned;

second optical dividing means for dividing an optical signal obtained by wavelength-division-multiplexing said optical outputs from optical transmitters;

wavelength dividing means with transmission characteristics maximizing or minimizing the transmission ratio thereof at a plurality of predetermined wavelengths for wavelength-dividing an optical output of said second optical dividing means; and judging means for judging deviation in optical wavelength of each of said optical transmitters by referring to the intensity of an optical output from said first optical dividing means, and the intensity of an optical output having a corresponding wavelength from said wavelength dividing means.

7. The optical wavelength monitoring apparatus according to claim 6 wherein said judging means includes:

first optical detecting means for converting an optical output of a corresponding wavelength from said wavelength dividing means into an electrical signal;

second optical detecting means for converting an optical output from corresponding one of said first optical dividing means into an electrical signal;

differential means for calculating a difference between the output level of said first optical detecting means and the output level of said second optical detecting means; and comparing means for comparing the output level of said differential means with a predetermined level.

8. The optical wavelength monitoring apparatus according to claim 7 wherein:

said first optical detecting means including a first light receiving element for converting an optical output of a corresponding wavelength from said wavelength dividing means into an electric signal and first logarithmic amplifying means for logarithmic-amplifying an output signal from said first light receiving element;

said second optical detecting means including a second light receiving element for converting an optical output of said first optical dividing means into an electrical signal and second logarithmic amplifying means for logarithmic-amplifying an output signal from said second light receiving element; and said first and second logarithmic amplifying means having gains that are determined to substantially equalize output levels of said first and second logarithmic amplifying means when an optical output of corresponding one of said optical transmitters is one of said predetermined wavelengths assigned thereto.

9. A wavelength monitoring apparatus for monitoring wavelengths of a plurality of optical transmitters to which different optical wavelengths are assigned, comprising:

wavelength composing/dividing means with a plurality of wavelength ports and a composite port for composing beams of light introduced to said wavelength ports at transmission rates according to wavelength transmission characteristics of respective said wavelength ports and outputting the composite light from said composite port, and for dividing light introduced to said composite port at transmission rates according to wavelength transmission characteristics of respective said wavelength ports and outputting divisional beams of light from said wavelength ports;

2×2 optical dividing means connected to the optical output of each said optical transmitter and corresponding one of wavelength ports of said wavelength composing/dividing means;

reflecting means for reflecting a part of the optical output from said composite port of said wavelength composing/dividing means back to said composite port; and judging means for judging deviation in optical wavelength of each of said optical transmitters by referring to two beams of light from each said optical dividing means, one of said two beams being light divided from the output of associated one of said optical transmitters, and the other of said two beams being light divided from light introduced from corresponding one of said wavelength ports of said composing/dividing means.

10. The optical wavelength monitoring apparatus according to claim 9 wherein said judging means includes:

first optical detecting means for converting said light divided from the output of associated one of said optical transmitters and introduced from said optical dividing means into an electrical signal;

second optical detecting means for converting said light divided from light introduced from corresponding one of said wavelength ports of said composing/dividing means and introduced from said optical dividing means into an electrical signal;

differential means for calculating a difference between the output level of said first optical detecting means and the output level of said second optical detecting means; and comparing means for comparing the output level of said differential means with a predetermined level.

11. The optical wavelength monitoring apparatus according to claim 10 wherein:

said first optical detecting means including a first light receiving element for converting said light divided from the output of associated one of said optical transmitters into an electrical signal, and first logarithmic amplifying means for logarithmic-amplifying an output signal from said first light receiving element;

said second optical detecting means including a second light receiving element for converting said light divided from light introduced from corresponding one of said wavelength ports of said composing/dividing means into an electrical signal, and second logarithmic amplifying means for logarithmic-amplifying an output signal from said second light receiving element; and said first and second logarithmic amplifying means having gains that are determined to substantially equalize output levels of said first and second logarithmic amplifying means when an optical output of corresponding one of said optical transmitters is one of said predetermined wavelengths assigned thereto.

12. The optical wavelength monitor apparatus according to one of claims 9 through 11, further comprising polarization rotating means interposed between said composite port of said wavelength composing/dividing means and said reflecting means for rotating the plane of polarization by a predetermined angle.

13. An optical wavelength monitoring apparatus for monitoring the wavelength of a laser source, comprising:

an optical filter for passing a predetermined wavelength band with a predetermined wavelength in the center thereof, said optical filter having transmission characteristics maximizing or minimizing the transmission ratio at said predetermined wavelength and decreasing the transmission ratio as incident light deviates from said predetermined wavelength;

first and second optical detecting means for converting incident light into electrical signals;

first optical dividing means for dividing an optical output from said laser source into two, and for supplying one to said first optical detecting means and the other to said optical filter;

second optical dividing means for dividing light from said optical filter into two, and for supplying one to said second optical detecting means and outputting the other to an optical transmission medium for information transmission;

differential means for calculating a difference between the output level of said first optical detecting means and the output level of said second optical detecting means; and comparing means for comparing the output level of said differential means with a predetermined level.

14. An optical wavelength monitoring apparatus for monitoring the wavelength of a laser source, comprising:

an optical filter for passing a predetermined wavelength band with a predetermined wavelength in the center thereof;

first optical dividing means for dividing an optical output from said laser source into two, and for supplying one said optical filter;

second optical dividing means for dividing light from said optical filter into two, and for supplying one to an optical transmission medium for information transmission;

first optical detecting means for converting incident light into electrical signals, said first optical detecting means including a first light receiving element for converting the other optical output of said first optical dividing means into an electrical signal, and first logarithmic amplifying means for logarithmic-amplifying an output signal from said first light receiving element;

second optical detecting means for converting incident light into electrical signals, said second optical detecting means including a second light receiving element for converting the other optical output of said second optical dividing means into an electrical signal, and second logarithmic amplifying means for logarithmic-amplifying an output signal from said second light receiving element;

differential means for calculating a difference between the output level of said first optical detecting means and the output level of said second optical detecting means; and comparing means for comparing the output level of said differential means with a predetermined level;

wherein said first and second logarithmic amplifying means comprises gains that are determined to substantially equalize output levels of said first and second logarithmic amplifying means when an optical output of said laser source has said predetermined wavelength.

15. The optical wavelength monitoring apparatus according to claim 14 wherein said first and second optical dividing means are beam splitters.

16. The optical wavelength monitoring apparatus according to claim 14 or 15 wherein said optical filter has transmission characteristics maximizing or minimizing the transmission ratio at said predetermined wavelength and decreasing the transmission ratio as incident light deviates from said predetermined wavelength.

17. An optical wavelength monitoring apparatus for monitoring the wavelength of a laser source, comprising:

an optical filter passing a predetermined wavelength band with a predetermined wavelength at the center thereof;

first and second optical detecting means for converting incident light into electrical signals;

optical dividing means for dividing an optical output from said laser source into two, and for supplying one to said first optical detecting means and the other to said optical filter, and supplying reflective light from said optical filter to said second optical detecting means;

differential means for calculating a difference between the output level of said first optical detecting means and the output level of said second optical detecting means; and comparing means for comparing the output level of said differential means with a predetermined level.

18. The optical wavelength monitoring apparatus according to claim 17 wherein:

said first optical detecting means including a first light receiving element for converting an optical output of said first optical dividing means into an electrical signal, and first logarithmic amplifying means for logarithmic-amplifying an output signal from said first light receiving element; and said second optical detecting means including a second light receiving element for converting an optical output of said second optical dividing means into an electrical signal, and second logarithmic amplifying means for logarithmic-amplifying an output signal from said second light receiving element.

19. The optical wavelength monitoring apparatus according to claim 17 or 18 wherein said optical dividing means comprise a beam splitter.

20. The optical wavelength monitoring apparatus according to claim 17 or 18 wherein said optical filter has transmission characteristics maximizing or minimizing the transmission ratio at said predetermined wavelength and decreasing the transmission ratio as incident light deviates from said predetermined wavelength.

* * * * *

UNITED STATES PATENT AND TRADEMARK OFFICE
CERTIFICATE OF CORRECTION

PATENT NO. : 5,898,502
DATED : April 27, 1999
INVENTOR(S) : Yukio Horiuchi; Shu Yamamoto It is certified that error appears in the above-identified patent and that said Letters Patent is hereby corrected as shown below:

Drawings,
FIG. 11, Sheet 11, in three of the boxes the word "Optical" is unclear. The figure should be shown as follows:

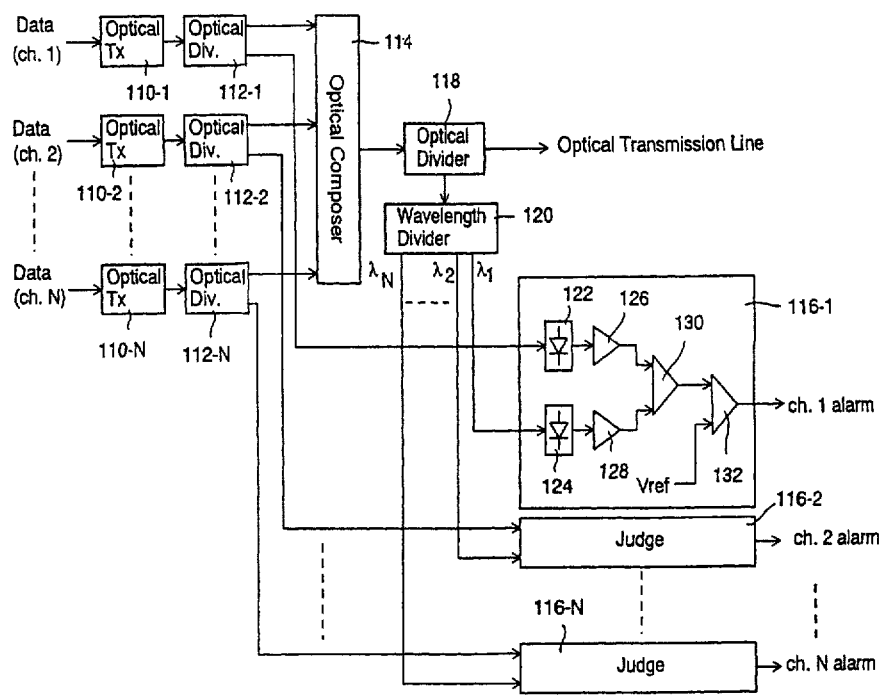

Fig. 11

UNITED STATES PATENT AND TRADEMARK OFFICE
CERTIFICATE OF CORRECTION

Figure 16:
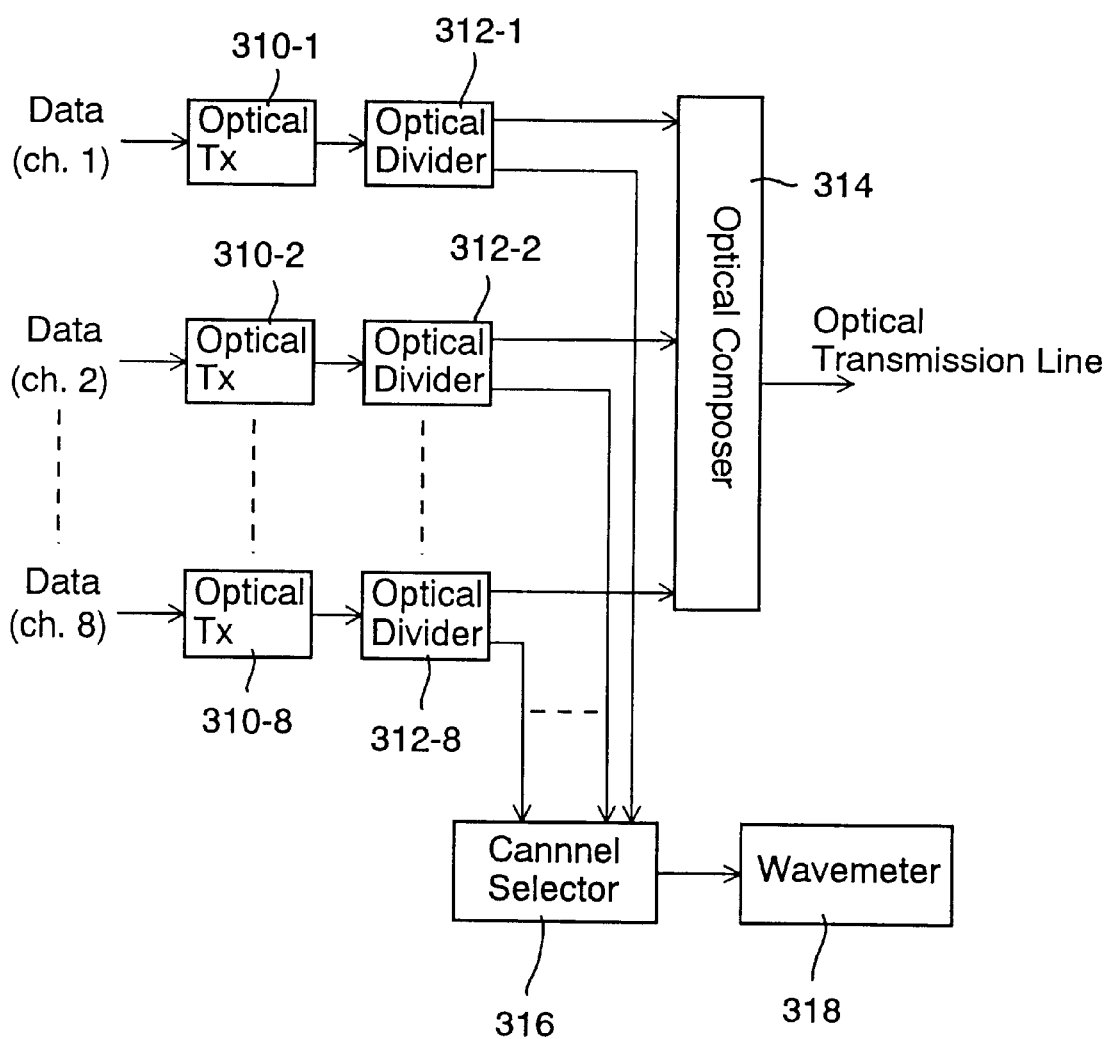
FIG. 16 is a schematic block diagram of a first conventional example.
Figure 17:
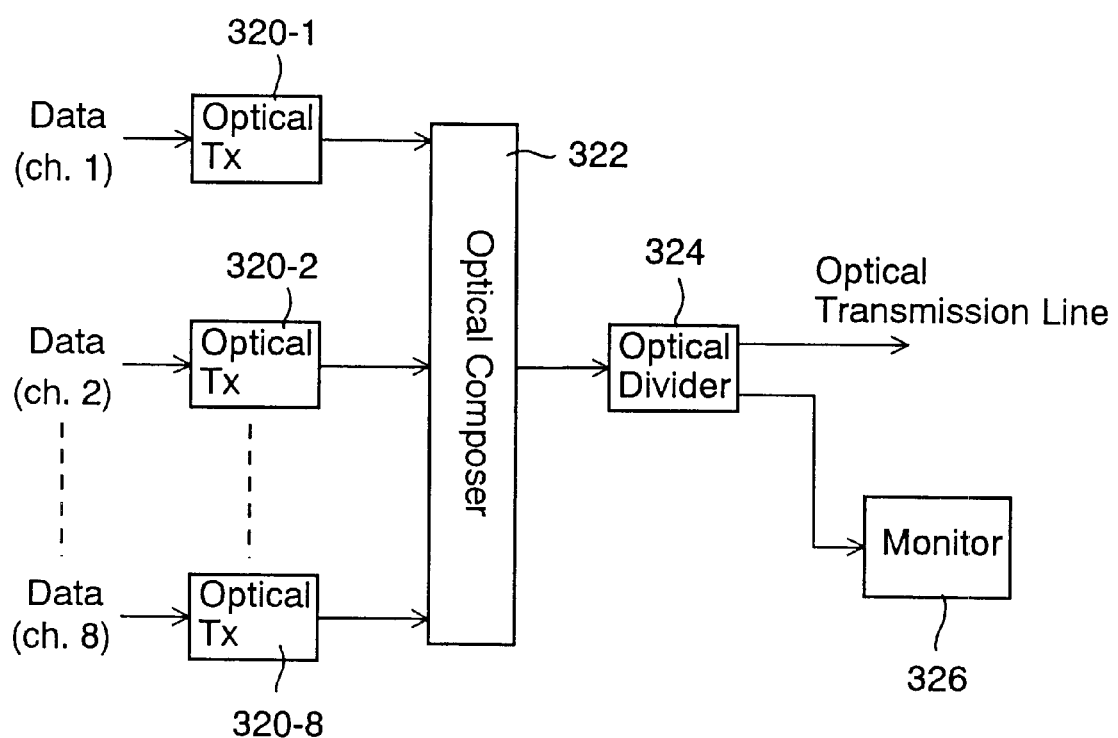
FIG. 17 is a schematic block diagram of a second conventional example.

PATENT NO. : 5,898,502
DATED : April 27, 1999
INVENTOR(S) : Yukio Horiuchi; Shu Yamamoto It is certified that error appears in the above-identified patent and that said Letters Patent is hereby corrected as shown below:

FIG. 16, Sheet 16, under "Fig. 16" insert -- PRIOR ART --.
Column 3, lines 11,12, replace "By utilizing light other than that for use in information transmission, it is prevented to decrease the" with -- Utilizing light other than that for use in information transmission prevents a decrease in the --.
Column 4, line 3, replace "device. In" with -- device, in --.
Column 5, line 28, replace "doe" with -- does --.
Column 6, line 42, replace "photo diode" with -- photodiode --.
Column 6, line 51, replace "shift" with -- shifted --.
Column 7, line 35, replace "an logarithmic" with -- a logarithmic --.
Column 7, line 40, replace "higher, An" with -- higher, an --.
Column 11, line 2, replace "planer" with -- planar --.
Column 11, line 20, delete "to the" (second occurrence).
Column 12, line 25, replace "1161-1" with -- 116-1 --.
Column 14, line 67, after "interferes" insert -- with --.
Column 15, line 4, replace "wavelength-" with -- wavelength --.
Column 15, line 15, replace "supplied" with -- supplies --.
Column 15, line 32, after "results in" delete "as".

UNITED STATES PATENT AND TRADEMARK OFFICE
CERTIFICATE OF CORRECTION

PATENT NO. : 5,898,502
DATED : April 27, 1999
INVENTOR(S) : Yukio Horiuchi; Shu Yamamoto It is certified that error appears in the above-identified patent and that said Letters Patent is hereby corrected as shown below:

Column 15, line 60, replace "a apparatus" with -- an apparatus --.
Column 16, line 2, replace "detective" with -- detection --.

Signed and Sealed this

Twentieth Day of March, 2001

*Attest:*

NICHOLAS P. GODICI

*Attesting Officer*   *Acting Director of the United States Patent and Trademark Office*